US011678031B2

(12) United States Patent
Yoon et al.

(10) Patent No.: US 11,678,031 B2
(45) Date of Patent: Jun. 13, 2023

(54) AUTHORING COMMENTS INCLUDING TYPED HYPERLINKS THAT REFERENCE VIDEO CONTENT

(71) Applicant: Microsoft Technology Licensing, LLC, Redmond, WA (US)

(72) Inventors: Dongwook Yoon, Vancouver (CA); Sol Sidney Fels, Vancouver (CA); Matin Yarmand, Vancouver (CA)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/389,807

(22) Filed: Apr. 19, 2019

(65) Prior Publication Data

US 2020/0336805 A1 Oct. 22, 2020

(51) Int. Cl.
*H04N 21/858* (2011.01)
*G06F 40/134* (2020.01)
(Continued)

(52) U.S. Cl.
CPC ....... *H04N 21/8586* (2013.01); *G06F 40/134* (2020.01); *H04N 21/4722* (2013.01); *H04N 21/4788* (2013.01); *H04N 21/8547* (2013.01)

(58) Field of Classification Search
CPC .......... H04N 21/8586; H04N 21/4722; H04N 21/4788; H04N 21/8547; G06F 40/134
(Continued)

(56) References Cited

U.S. PATENT DOCUMENTS 6,564,383 B1    5/2003   Combs et al.
6,921,336 B1    7/2005   Best
(Continued)

FOREIGN PATENT DOCUMENTS

CN    101288069 A    10/2008
CN    103621106 A    3/2014
(Continued)

OTHER PUBLICATIONS

Chua, et al., "Facilitating complex referencing of visual materials in asynchronous discussion interface", In Proceedings of the ACM on Human-Computer Interaction, vol. 1, Issue 2, Article 34, Nov. 2017, 19 Pages. (Year: 2017).*

(Continued)

*Primary Examiner* — Alfonso Castro
(74) *Attorney, Agent, or Firm* — Newport IP, LLC; Scott Y. Shigeta

(57) ABSTRACT

A user interface (UI) includes a video display area for presenting video content, a text entry field, and a comment section. The UI also provides UI controls for enabling a user to select a portion of the video content and for generating a typed hyperlink in the text entry field that references the selected portion of the video content. A UI control for creating a new comment in the comment section of the UI that includes the typed hyperlink from the text entry field is also provided. A user can select a typed link in a comment and, in response thereto, the content type for the referenced portion of the video content can be determined based on data in the selected link. A preview of the portion of the video content can then be presented based upon the determined content type.

20 Claims, 24 Drawing Sheets

(51) Int. Cl.
- *H04N 21/4722* (2011.01)
- *H04N 21/4788* (2011.01)
- *H04N 21/8547* (2011.01)

(58) Field of Classification Search
USPC .......................................................... 725/32
See application file for complete search history.

(56) References Cited

U.S. PATENT DOCUMENTS

| | | |
|---|---|---|
| 7,712,125 B2 | 5/2010 | Herigstad et al. |
| 7,941,762 B1 | 5/2011 | Tovino et al. |
| 8,332,886 B2 | 12/2012 | Lanza et al. |
| 8,531,050 B2 | 9/2013 | Barney et al. |
| 8,698,746 B1 | 4/2014 | Merrick |
| 8,740,708 B2 | 6/2014 | Karacal et al. |
| 8,819,719 B1 | 8/2014 | Chen et al. |
| 8,830,170 B2 | 9/2014 | Kao et al. |
| 8,984,405 B1 | 3/2015 | Geller et al. |
| 8,996,625 B1 | 3/2015 | Singleton et al. |
| 9,918,128 B2 | 3/2018 | Courouge et al. |
| 9,966,112 B1 | 5/2018 | Kulkarni et al. |
| 10,009,644 B2 | 6/2018 | Aimone et al. |
| 10,163,073 B2 | 12/2018 | Staats |
| 10,171,877 B1 | 1/2019 | Shah et al. |
| 10,303,328 B2 | 5/2019 | Na et al. |
| 10,924,441 B1 | 2/2021 | Lewis et al. |
| 11,025,684 B2 | 6/2021 | Lin |
| 2002/0069218 A1 | 6/2002 | Sull |
| 2002/0078456 A1 | 6/2002 | Hudson et al. |
| 2002/0120925 A1 | 8/2002 | Logan |
| 2002/0144273 A1 | 10/2002 | Reto |
| 2002/0162120 A1 | 10/2002 | Mitchell |
| 2003/0216177 A1 | 11/2003 | Aonuma et al. |
| 2004/0098754 A1 | 5/2004 | Vella et al. |
| 2004/0260753 A1 | 12/2004 | Regan |
| 2005/0210502 A1 | 9/2005 | Flickinger et al. |
| 2006/0041472 A1 | 2/2006 | Lukose et al. |
| 2006/0064716 A1* | 3/2006 | Sull .................. G06F 16/7857 725/37 |
| 2006/0173821 A1 | 8/2006 | Hennum et al. |
| 2007/0022437 A1 | 1/2007 | Gerken et al. |
| 2007/0033515 A1 | 2/2007 | Sull et al. |
| 2007/0052177 A1 | 3/2007 | Ikeda et al. |
| 2007/0060391 A1 | 3/2007 | Ikeda et al. |
| 2007/0124756 A1 | 5/2007 | Covell et al. |
| 2007/0124775 A1 | 5/2007 | Dacosta |
| 2007/0244902 A1 | 10/2007 | Seide et al. |
| 2007/0245243 A1* | 10/2007 | Lanza ................. G06Q 30/0277 715/723 |
| 2007/0271580 A1 | 11/2007 | Tischer et al. |
| 2008/0046925 A1* | 2/2008 | Lee ..................... G11B 27/11 725/37 |
| 2008/0082510 A1 | 4/2008 | Wang et al. |
| 2008/0178241 A1 | 7/2008 | Gilboy |
| 2009/0007200 A1 | 1/2009 | Amento et al. |
| 2009/0049385 A1 | 2/2009 | Blinnikka et al. |
| 2009/0067847 A1 | 3/2009 | Nakamura |
| 2009/0163274 A1 | 6/2009 | Kando |
| 2009/0164904 A1 | 6/2009 | Horowitz et al. |
| 2009/0187825 A1* | 7/2009 | Sandquist ............... G06F 16/70 715/719 |
| 2009/0195392 A1 | 8/2009 | Zalewski et al. |
| 2009/0210778 A1 | 8/2009 | Kulas et al. |
| 2009/0210779 A1* | 8/2009 | Badoiu ................ G06F 16/7867 715/230 |
| 2009/0249388 A1 | 10/2009 | Seidel et al. |
| 2010/0192173 A1 | 7/2010 | Mizuki et al. |
| 2010/0199182 A1 | 8/2010 | Lanza et al. |
| 2010/0199318 A1 | 8/2010 | Chang et al. |
| 2011/0010656 A1 | 1/2011 | Mokotov et al. |
| 2011/0055713 A1 | 3/2011 | Gruenewald et al. |
| 2011/0190052 A1 | 8/2011 | Takeda et al. |
| 2011/0247042 A1 | 10/2011 | Mallinson |
| 2012/0039539 A1* | 2/2012 | Boiman ................. G11B 27/34 382/224 |
| 2012/0046767 A1 | 2/2012 | Shimohata et al. |
| 2012/0133582 A1 | 5/2012 | Ohsawa et al. |
| 2012/0151320 A1 | 6/2012 | Mcclements et al. |
| 2012/0151347 A1* | 6/2012 | McClements, IV ........................ G06Q 30/0643 715/716 |
| 2012/0192222 A1 | 7/2012 | Kumar et al. |
| 2012/0192228 A1 | 7/2012 | Zito et al. |
| 2012/0297400 A1 | 11/2012 | Hill et al. |
| 2012/0309515 A1 | 12/2012 | Chung et al. |
| 2013/0004138 A1 | 1/2013 | Kilar et al. |
| 2013/0011121 A1* | 1/2013 | Forsyth ................. G11B 27/034 386/245 |
| 2013/0024532 A1 | 1/2013 | Lee et al. |
| 2013/0154923 A1 | 6/2013 | Mock |
| 2013/0163948 A1 | 6/2013 | Kano |
| 2013/0171897 A1 | 7/2013 | Hsu |
| 2013/0238413 A1 | 9/2013 | Carlson et al. |
| 2013/0332523 A1 | 12/2013 | Luu et al. |
| 2013/0335226 A1 | 12/2013 | Shen et al. |
| 2014/0033040 A1 | 1/2014 | Thomas et al. |
| 2014/0040776 A1 | 2/2014 | Dann et al. |
| 2014/0052513 A1 | 2/2014 | Ryan et al. |
| 2014/0067828 A1 | 3/2014 | Archibong et al. |
| 2014/0079371 A1 | 3/2014 | Tang et al. |
| 2014/0089801 A1 | 3/2014 | Agrawal |
| 2014/0168071 A1 | 6/2014 | Ahmed et al. |
| 2014/0215360 A1 | 7/2014 | Degani et al. |
| 2014/0219629 A1 | 8/2014 | Mcintosh et al. |
| 2014/0219634 A1 | 8/2014 | Mcintosh et al. |
| 2014/0309511 A1 | 10/2014 | Stål |
| 2014/0340465 A1 | 11/2014 | Shi et al. |
| 2015/0046812 A1 | 2/2015 | Darby et al. |
| 2015/0100915 A1 | 4/2015 | Kubota et al. |
| 2015/0121418 A1 | 4/2015 | Jain et al. |
| 2015/0143211 A1* | 5/2015 | Kaufthal ................ G06F 40/134 715/205 |
| 2015/0182861 A1 | 7/2015 | Winter et al. |
| 2015/0293996 A1 | 10/2015 | Liu |
| 2015/0365716 A1 | 12/2015 | Fonseca et al. |
| 2016/0182423 A1 | 6/2016 | Tevosyan |
| 2016/0247535 A1* | 8/2016 | Latulipe ................. G06F 3/0481 |
| 2016/0259790 A1 | 9/2016 | Mashiach et al. |
| 2016/0284382 A1 | 9/2016 | Luo |
| 2016/0359771 A1 | 12/2016 | Sridhar |
| 2016/0373388 A1 | 12/2016 | Katis et al. |
| 2017/0017639 A1 | 1/2017 | Bute et al. |
| 2017/0060823 A1 | 3/2017 | Zheng et al. |
| 2017/0070779 A1 | 3/2017 | Kim et al. |
| 2017/0131864 A1 | 5/2017 | Edgar |
| 2017/0140051 A1 | 5/2017 | Ball et al. |
| 2017/0154125 A1 | 6/2017 | Balakrishnan et al. |
| 2017/0169856 A1 | 6/2017 | Wang |
| 2017/0180276 A1 | 6/2017 | Gershony et al. |
| 2017/0187772 A1 | 6/2017 | Paul |
| 2017/0249017 A1 | 8/2017 | Ryu et al. |
| 2017/0295402 A1 | 10/2017 | Courouge et al. |
| 2017/0374414 A1 | 12/2017 | Knox |
| 2018/0109828 A1 | 4/2018 | Knox |
| 2018/0115802 A1 | 4/2018 | Knox |
| 2018/0124438 A1 | 5/2018 | Barnett |
| 2018/0124458 A1 | 5/2018 | Knox |
| 2018/0124459 A1 | 5/2018 | Knox |
| 2018/0211552 A1 | 7/2018 | Samuelson et al. |
| 2018/0293313 A1 | 10/2018 | Hauptmann et al. |
| 2018/0309705 A1 | 10/2018 | Stahl et al. |
| 2018/0322346 A1 | 11/2018 | Davies et al. |
| 2018/0356952 A1 | 12/2018 | Boothroyd et al. |
| 2019/0034483 A1 | 1/2019 | Millius et al. |
| 2019/0197101 A1 | 6/2019 | Lambert et al. |
| 2019/0246165 A1* | 8/2019 | Brouwer ............. G06F 16/7867 |
| 2020/0012718 A1 | 1/2020 | Kung et al. |
| 2020/0044996 A1 | 2/2020 | Johnson et al. |
| 2020/0067867 A1 | 2/2020 | Tal et al. |
| 2020/0120392 A1 | 4/2020 | Tang et al. |

(56) References Cited

U.S. PATENT DOCUMENTS

2020/0336718 A1    10/2020    Yoon et al.
2020/0336794 A1    10/2020    Fels et al.
2020/0336806 A1    10/2020    Feis et al.

FOREIGN PATENT DOCUMENTS

| CN | 105580013 | A | 5/2016 |
|---|---|---|---|
| JP | 2010079577 | A | 4/2010 |
| KR | 20150030387 | A | 3/2015 |
| WO | 0028396 | A2 | 5/2000 |

OTHER PUBLICATIONS

Bakhshi, et al., "Faces engage us: Photos with faces attract more likes and comments on Instagram", In Proceedings of the SIGCHI Conference on Human Factors in Computing Systems, Apr. 26, 2014, pp. 965-974.
Bangor, et al., "Determining what individual SUS scores mean: Adding an adjective rating scale", In Journal of Usability Studies, vol. 4, Issue 3, May 1, 2009, 8 Pages.
Brooke, John, "SUS—A quick and dirty usability scale", In Proceedings of Usability evaluation in industry, vol. 189, Issue 194, Sep. 1996, 7 Pages.
Brush, et al., "Supporting Interaction Outside of Class: Anchored Discussions vs. Discussion Boards", In Proceedings of the Conference on Computer Support for Collaborative Learning: Foundations for a CSCL Community, Jan. 7, 2002, 10 Pages.
Chorianopoulos, Konstantinos, "A taxonomy of asynchronous instructional video styles", In the Proceedings of International Review of Research in Open and Distributed Learning, vol. 19, Issue 1, Feb. 1, 2018, pp. 294-311.
Christensen, et al., "The MOOC phenomenon: Who takes massive open online courses and why", In SSRN eLibrary, Dec. 2014, 9 Pages.
Chua, et al., "Facilitating complex referencing of visual materials in asynchronous discussion interface", In Proceedings of the ACM on Human-Computer Interaction, vol. 1, Issue 2, Article 34, Nov. 2017, 19 Pages.
Clark, et al., "Grounding in communication", In American Psychological Association from Perspectives on Socially Shared Cognition, Jan. 1, 1991, pp. 127-149.
Clark, Herbert H., "Using language", By Cambridge University Press, 1996, 58 Pages.
Dorn, et al., "Piloting TrACE: Exploring Spatiotemporal Anchored Collaboration In Asynchronous Learning", In Proceedings of the 18th ACM Conference on Computer Supported Cooperative Work & Social Computing Mar. 14, 2015, pp. 393-403.
Fong, et al., "ViDeX: A platform for personalizing educational videos", In Proceedings of the 18th ACM/IEEE Joint Conference on Digital Libraries, Jun. 033, 2018, pp. 331-332.
Fussell, et al., "Gestures Over Video Streams To Support Remote Collaboration On Physical Tasks", In Journal of Human-Computer Interaction, vol. 19, Issue 3, Sep. 1, 2004, pp. 273-309.
Gergle, et al., "Language Efficiency and Visual Technology: Minimizing Collaborative Effort with Visual Information.", In Journal of Language and Social Psychology, vol. 23, Issue 4, Dec. 1, 2004, pp. 491-517.
Glassman, et al., "Mudslide: A Spatially Anchored Census of Student Confusion for Online Lecture Videos", In Proceedings of the 33rd Annual ACM Conference on Human Factors in Computing Systems, Apr. 18, 2015, pp. 1555-1564.
Hupei, et al., "The effects of the codability and discriminability of the referents on the collaborative referring procedure", In British Journal of Psychology, vol. 82, Issue 4, Nov. 1991, pp. 449-462.
Jones, et al., "Talking Text and Talking Back: "My BFF Jill" from Boob Tube to YouTube", In Journal of Computer-Mediated Communication, vol. 14, Issue 4, Jul. 1, 2009, pp. 1050-1079.

Kavada, Anastasia, "Engagement, bonding, and identity across multiple platforms: Avaaz on Facebook, YouTube, and MySpace", In MedieKultur: Journal of media and communication research, vol. 28, Issue 52, Mar. 30, 2012, 21 Pages.
Khan, Laeeq M., "Social media engagement: What motivates user participation and consumption on YouTube?", In Journal of Computers in Human Behavior,Jan. 1, 2017, pp. 236-247.
Kim, et al., "Crowdsourcing step-by-step information extraction to enhance existing how-to videos", In Proceedings of the SIGCHI Conference on Human Factors in Computing Systems, Apr. 26, 2014, pp. 4017-4026.
Kirk, et al., "Turn It This Way: Grounding Collaborative Action with Remote Gestures", In Proceedings of the SIGCHI Conference on Human Factors in Computing Systems, Apr. 28, 2007, pp. 1039-1048.
Lajoie, et al., "Computers as cognitive tools", In Journal of Computing in Higher Education, Mar. 1995.
Lee, et al., "Detecting and Visualizing The Dispute Structure Of The Replying Comments In The Internet Forum Sites", In Proceedings of International Conference on Cyber-Enabled Distributed Computing and Knowledge Discovery, Oct. 10, 2010, pp. 456-463.
Leetiernan, Scott, "Fostering Engagement in Asynchronous Learning through Collaborative Multimedia Annotation", In Technical Report MSR-TR-2000-91, Interact, Jul. 1, 2001, 8 Pages.
Madden, et al., "A classification scheme for content analyses of YouTube video comments", In Journal of Documentation, vol. 69, Issue 5, Sep. 2, 2013, pp. 693-714.
Molyneaux, et al., "Exploring the gender divide on YouTube: An analysis of the creation and reception of vlogs", In American Communication Journal, vol. 10, Issue 2, Jan. 2008, 14 Pages.
Mu, Xiangming, "Towards effective video annotation: An approach to automatically link notes with video content", In Journal of Computers & Education, vol. 55, Issue 4, Dec. 1, 2010, pp. 1752-1763.
Pavel, et al., "VidCrit: Video-based asynchronous video review", In Proceedings of the 29th Annual Symposium on User Interface Software and Technology, Oct. 16, 2016, pp. 517-528.
Potthast, et al., "Opinion summarization of web comments", In Proceedings of the 32nd European Conference on Information Retrieval, Mar. 28, 2010, pp. 668-669.
Roll, Ido, "Learning at Scale", International Journal of Artificial Intelligence in Education, vol. 28, Issue 4, Dec. 2018, pp. 471-477.
Rotman, et al., "The 'WeTube' in YouTube—creating an online community through video sharing", In International Journal of Web Based Communities, vol. 6, Issue 3, Jan. 1, 2010, pp. 317-333.
Schultes, et al., "Leave a comment! An in-depth analysis of user comments on YouTube", 11th International Conference on Wirtschaftsinformatik, vol. 42, Feb. 27, 2013, pp. 659-673.
Siemens, George, "Connectivism : A learning theory for the digital age", Retreived From http://www.edtechpolicy.org/AAASGW/Session2/siemens_article.pdf, Jan. 5, 2005, 10 Pages.
Siersdorfer, et al., "How useful are your comments?: Analyzing and predicting YouTube comments and comment ratings", In Proceedings of the 19th International Conference on World Wide Web, Apr. 26, 2010, pp. 891-900.
Thomas, Matthew JW., "Learning within incoherent structures: The space of online discussion forums", In Journal of Computer Assisted Learning, vol. 18, Issue 3, Dec. 11, 2002, pp. 351-366.
Thompson, Clive, "How Khan Academy is changing the rules of education", In Wired Magazine, vol. 126, Jul. 15, 2011, pp. 1-5.
Tsang, et al., "Boom Chameleon: Simultaneous capture of 3D viewpoint, voice and gesture annotations on a spatially-aware display", In Proceedings of the 15th annual ACM symposium on User interface software and technology, Oct. 27, 2002, 10 Pages.
Vygotsky, Lev S., "Mind in society: The development of higher psychological processes", In Publication of Harvard University Press, Oct. 15, 1980, 170 Pages.
Welbourne, et al., "Science communication on YouTube: Factors that affect channel and video popularity", In Journal of Public Understanding of Science, vol. 25, Issue 6, Aug. 2016, 12 Pages.
Yoon, et al., "RichReview: Blending Ink, Speech, and Gesture to Support Collaborative Document Review", In Proceedings of the

(56) References Cited

OTHER PUBLICATIONS

27th Annual ACM Symposium on User Interface Software and Technology, Oct. 5, 2014, pp. 481-490.
Yuan, et al., "Automatic Video Genre Categorization Using Hierarchical SVM", In Proceedings of the IEEE International Conference on Image Processing, Oct. 8, 2006, pp. 2905-2908.
Zyto, et al., "Successful Classroom Deployment of a Social Document Annotation System", In Proceedings of the SIGCHI Conference on Human Factors in Computing Systems, May 5, 2012, pp. 1883-1892.
"International Search Report and Written Opinion Issued in PCT Application No. PCT/US2020/025616", dated Jun. 3, 2020, 10 Pages.
"How to Link to a Certain Time in a YouTube Video's Comment Box", Retrieved From: https://web.archive.org/web/20190412051657/https://www.wikihow.com/Link-to-a-Certain-Time-in-a-YouTube-Video's-Comment-Box, Apr. 12, 2019, 9 Pages.
"YouTube(TM) On Hover", Retrieved From: https://web.archive.org/web/20180713134812/https://add0n.com/youtube-hover.html, Jul. 13, 2018, 4 Pages.
"Final Office Action Issued in U.S. Appl. No. 16/389,828", dated Sep. 9, 2022, 14 Pages.
"Non Final Office Action Issued in U.S. Appl. No. 16/389,828", dated Jan. 24, 2022, 25 Pages.
"Non Final Office Action Issued in U.S. Appl. No. 16/389,828", dated Oct. 28, 2020, 34 Pages.
"Non Final Office Action Issued in U.S. Appl. No. 16/389,853", dated Apr. 9, 2020, 16 Pages.
"Notice of Allowance Issued in U.S. Appl. No. 16/389,853", dated Sep. 23, 2020, 9 Pages.
"Non Final Office Action Issued in U.S. Appl. No. 16/389,864", dated Aug. 19, 2020, 14 Pages.
"Notice of Allowance Issued in U.S. Appl. No. 16/389,864", dated Feb. 3, 2021, 7 Pages.
"Final Office Action Issued in U.S. Appl. No. 16/389,828", dated Apr. 19, 2021, 40 Pages.
"First Office Action and Search report Issued in Chinese Patent Application No. 202080029863.5", dated Sep. 2, 2022, 15 Pages.
Ahmed, Waqas, "Video Pinner for Chrome Keep YouTube Videos in View as you Scroll Down the Comments", Retrieved From: https://www.addictivetips.com/web/keep-youtube-videos-in-view-as-you-scroll-down-comments-chrome/, Nov. 13, 2013, 18 Pages.
Li, et al., "Classification of General Audio Data for Content-Based Retrieval", In Journal of Pattern Recognition Letters, vol. 22, Issue 5, Apr. 2001, pp. 533-544.
"International Search Report and Written Opinion Issued in PCT Application No. PCT/US20/025632", dated Jun. 24, 2020, 12 Pages.
"International Search Report and Written Opinion Issued in PCT Application No. PCT/US20/025847", dated Jul. 17, 2020, 14 Pages.
"International Search Report and Written Opinion Issued in PCT Application No. PCT/US20/025851", dated Jul. 13, 2020, 16 Pages.
"Office Action Issued in Chinese Patent Application No. 202080029718.7", dated Feb. 18, 2023, 14 Pages.
"Notice of Allowance Issued in Chinese Patent Application No. 202080029863.5", dated Feb. 12, 2023, 4 Pages.
"Office Action Issued in European Patent Application No. 20721340.6", dated Mar. 1, 2023, 8 Pages.

\* cited by examiner

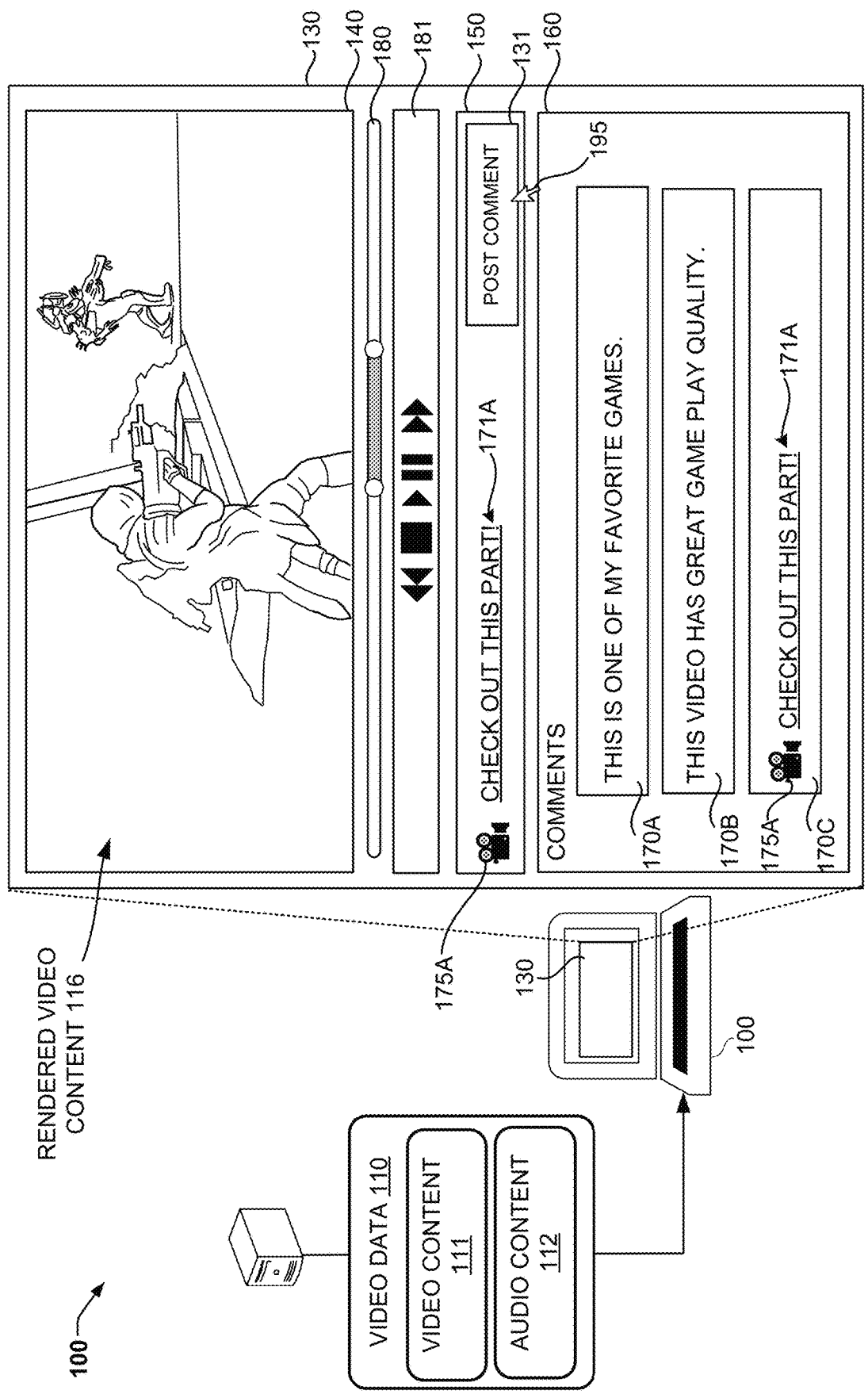

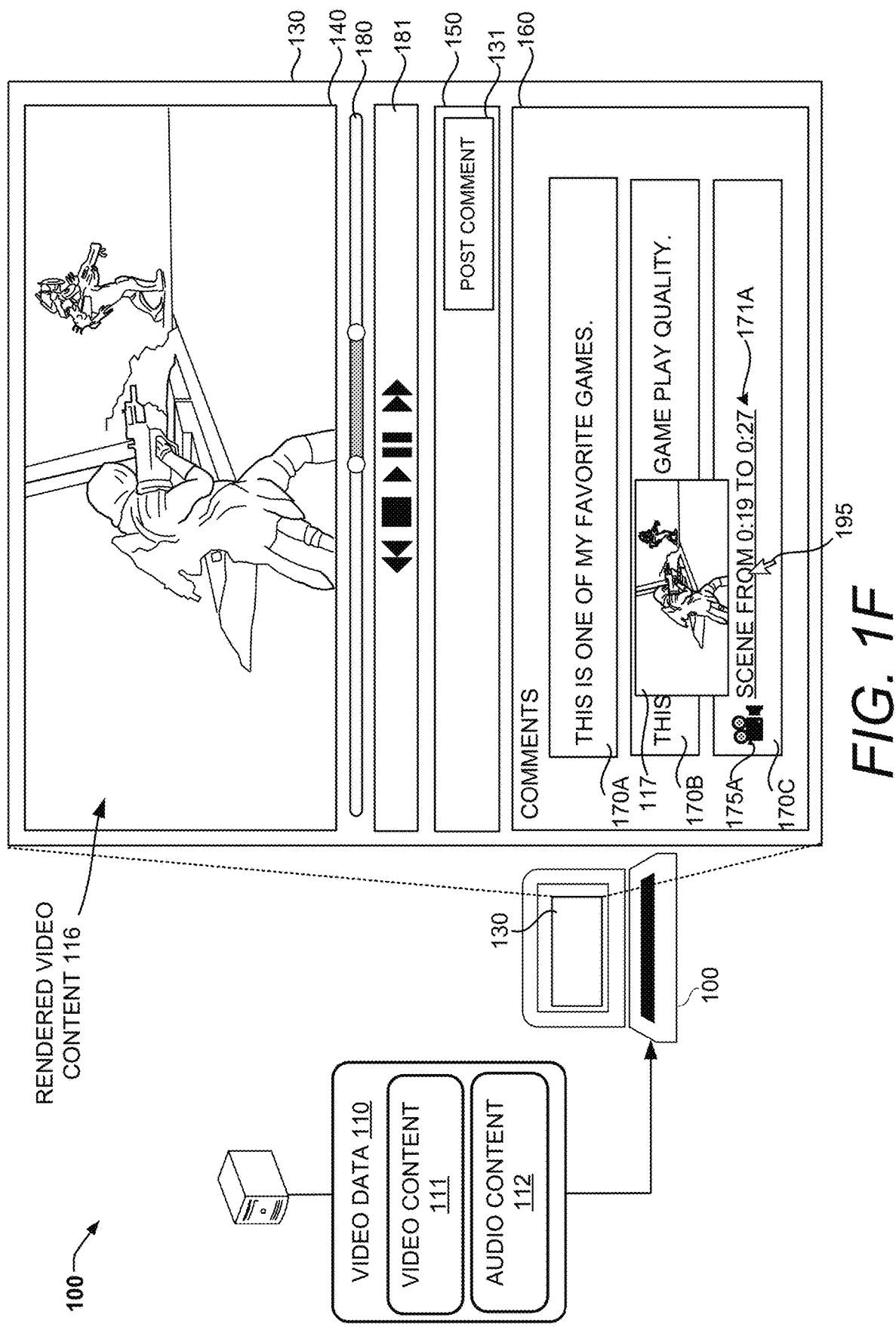

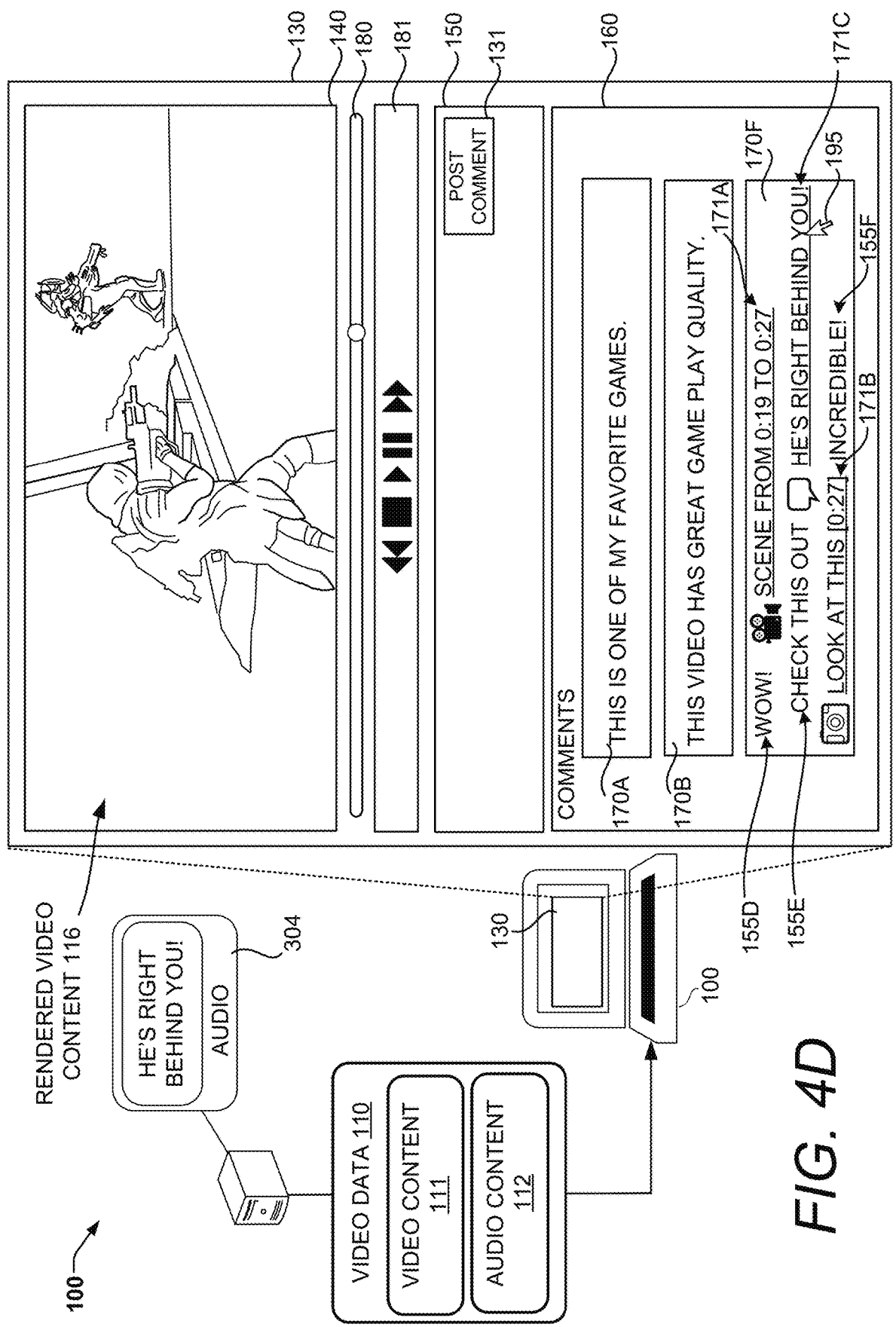

AUTHORING COMMENTS INCLUDING TYPED HYPERLINKS THAT REFERENCE VIDEO CONTENT

BACKGROUND

Commenting on videos is becoming popular and ubiquitous on many social, educational, and recreational platforms. Many video-based commenters refer to the video content to contextualize and specify their messages. Commenters can refer to visual entities or specific sound bites in a number of ways. For instance, users can refer to a sound or a quote of a person at a particular time or provide a timestamp, etc. In some systems, users can include a link to their comment and allow users to view a video starting at a particular point in time.

Although existing systems provide a platform for users to provide comments, user interfaces that are used today are simplistic in nature and do not provide tools for optimizing the user experience, both from the commenter's point of view and the viewer's perspective. For instance, in some existing systems, when viewers select a video link associated with a comment, current systems often cause the user interface to scroll away from the comment section in order to display the selected video. This feature causes a number of inefficiencies and complications. In particular, when interacting with existing systems, users cannot maintain a view of the comments when they select a comment to view a video. This does not allow users to continually view comments they are interested in while concurrently watching the related video. This can cause a number of inefficiencies by requiring users to scroll back and forth between the comments section and the video section of a user interface, which can be extremely difficult in situations where there are hundreds or thousands of comments. This type of navigation is highly inefficient with respect to the user's productivity and computing resources.

It is with respect to these and other technical challenges that the disclosure made herein is presented.

SUMMARY

The technologies disclosed herein provide improvements over existing systems by enabling users to create hyperlinks (referred to herein as "typed hyperlinks," "typed links," or simply "links") to video content that specify a content type for the referenced video content. For instance, the content type might be an interval of video content, a region in a frame of video content, or closed caption text in the video content. Users can insert comments including typed hyperlinks into a comments section of a user interface ("UI") associated with the video content. Users can then select a typed hyperlink, such as by hovering a mouse cursor over a typed hyperlink, to view a preview of the referenced video content without navigating away from the comments section of the UI. In this way, users do not have to return to the original video content and search for the video content as with traditional systems.

The technologies described herein enable more efficient use of computing resources. In particular, by controlling aspects of a computing system to enable the definition of typed hyperlinks and to enable use of the hyperlinks to present previews of portions of video content, a system can improve a number of efficiencies with respect to user productivity and promote more efficient use of computing resources. For example, elimination of the manual process described above for returning to video content and searching for content referenced by a comment leads to more efficient use of computing resources, such as memory, network, and processing resources. Technical benefits other than those specifically mentioned herein might also be realized through implementations of the disclosed technologies.

In order to provide the technical benefits described above, and potentially others, a data processing system ("system") implementing the disclosed technologies can provide a UI on a display screen that includes a video display area (which might be referred to as the "display area"), a text entry field, and a comment section. The video display area can present video content. The video content can include moving frames of video, audio associated with the video, closed caption text, and potentially other types of video content.

The disclosed system also provides UI controls for enabling a user to select a portion of video content displayed in the display area. For example, UI controls can be provided to enable a user to select an interval of video content, a region in a frame of video content, or closed caption text associated with the video content. A selected region in a frame of video content might encompass an object shown in the frame.

In some embodiments, a UI control for generating a typed hyperlink that references the selected portion of the video content is displayed adjacent to a UI control for selecting the portion of the video content. The UI control for generating the typed hyperlink can be located in other areas of the UI in other configurations. The disclosed system can detect user selection of the UI control for generating a typed hyperlink to the selected portion of the video content and, in response thereto, can insert a typed link to the selected portion of the video content in the text entry field.

As discussed briefly above, the typed link can include data identifying the content type for the selected portion of the video content. The typed link can include other types of data such as, for instance, data identifying an interval within video content, data identifying a portion of a frame of video content, or data identifying a portion of closed caption text in the video content. The typed link can also include text describing aspects of the referenced video content such as, for instance, link text that identifies a time period of an interval of video content, link text identifying a time associated with a frame of video, or link text that includes closed caption text. The link text is user-editable in some configurations.

In some embodiments, user selection of a typed link (e.g. by hovering a mouse cursor over the link) in the text entry field will cause the disclosed system to present a preview of the portion of the video content referenced by the typed link. For example, an interval of video might be played, a region within a frame of video content might be displayed, or audio of closed caption text might be played. The preview is presented adjacent to the typed link in some configurations but can be displayed in other locations in the UI in other configurations.

In some embodiments, a UI control for creating a new comment that includes a typed hyperlink in the comment section of the UI is presented adjacent to the text entry field. This UI control can be presented in other locations in the UI in other configurations. When the disclosed system detects user selection of this UI control, the system can create a new comment and display the new comment in the comment section of the UI. The new comment includes the typed link and, potentially, other content from the text entry field, such as user-provided text.

As discussed briefly above, the disclosed system also provides functionality for de-referencing the video content referred to by a typed link in the comments section of the UI. For instance, in one configuration a user can select a typed link in a comment, such as by hovering a mouse cursor over the typed link. In response thereto, the disclosed system can determine the content type for the referenced portion of the video content based on data in the link. The disclosed system can then present a preview of the portion of the video content based upon the determined content type for the portion of the video content. For example, an interval of video might be played, a region within a frame of video content might be displayed, or audio of closed caption text might be played. The preview is presented adjacent to the typed link in the comment in some configurations but can be displayed in other locations in the UI in other configurations.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "technologies," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 1E is a combined system and UI diagram that shows additional aspects of the system illustrated in FIG. 1A, according to one embodiment disclosed herein.

FIG. 1F is a combined system and UI diagram that shows additional aspects of the system illustrated in FIG. 1A, according to one embodiment disclosed herein.

FIG. 4D is a combined system and UI diagram that shows additional aspects of the system illustrated in FIG. 1A, according to one embodiment disclosed herein.

DETAILED DESCRIPTION

As described briefly above, a system is disclosed herein that provides a UI that includes a video display area for presenting video content, a text entry field, and a comment section. The UI also provides UI controls for enabling a user to select a portion of the video content and for generating a typed hyperlink in the text entry field that references the selected portion of the video content. A UI control for creating a new comment in the comment section of the UI that includes the typed hyperlink from the text entry field is also provided. A user can select a typed link in a comment and, in response thereto, the content type for the referenced portion of the video content can be determined based on data in the selected link. A preview of the portion of the video content can then be presented based upon the determined content type.

As also described briefly above, the disclosed technologies enable more efficient use of computing resources. In particular, by controlling aspects of a computing system to enable the definition of typed hyperlinks and to enable use of typed hyperlinks to present previews of portions of video content, a system can improve user productivity and utilize computing resources more efficiently than previous solutions. Technical benefits other than those specifically mentioned herein might also be realized through implementations of the disclosed technologies. Additional details regarding these aspects and others are provided below with reference to FIGS. 1A-6.

Figure 1A:
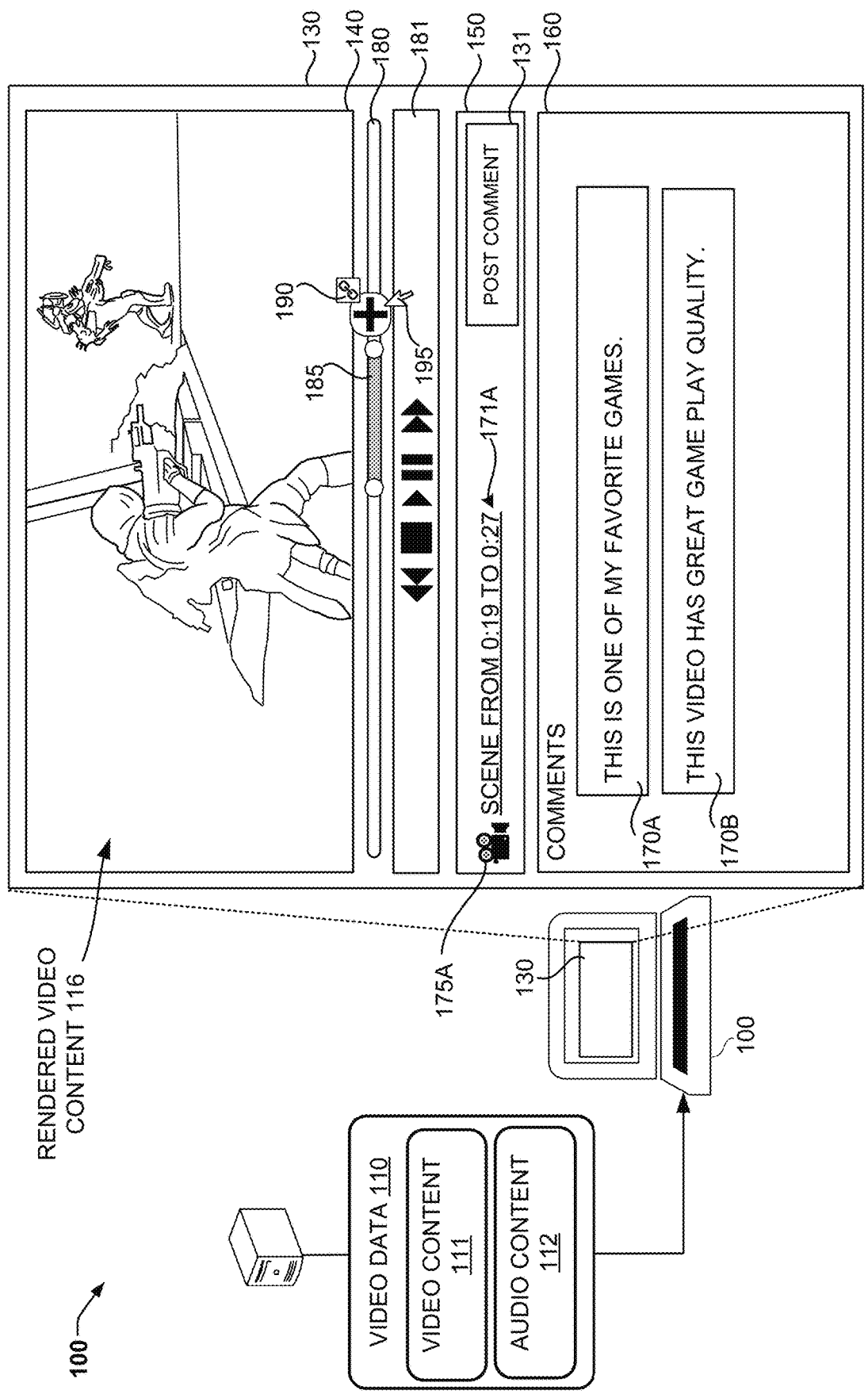
FIG. 1A is a combined system and UI diagram that shows aspects of a system disclosed herein that enables authoring of comments that include typed hyperlinks referencing video content and previewing video content referenced by typed hyperlinks, according to one embodiment disclosed herein.
Figure 1B:
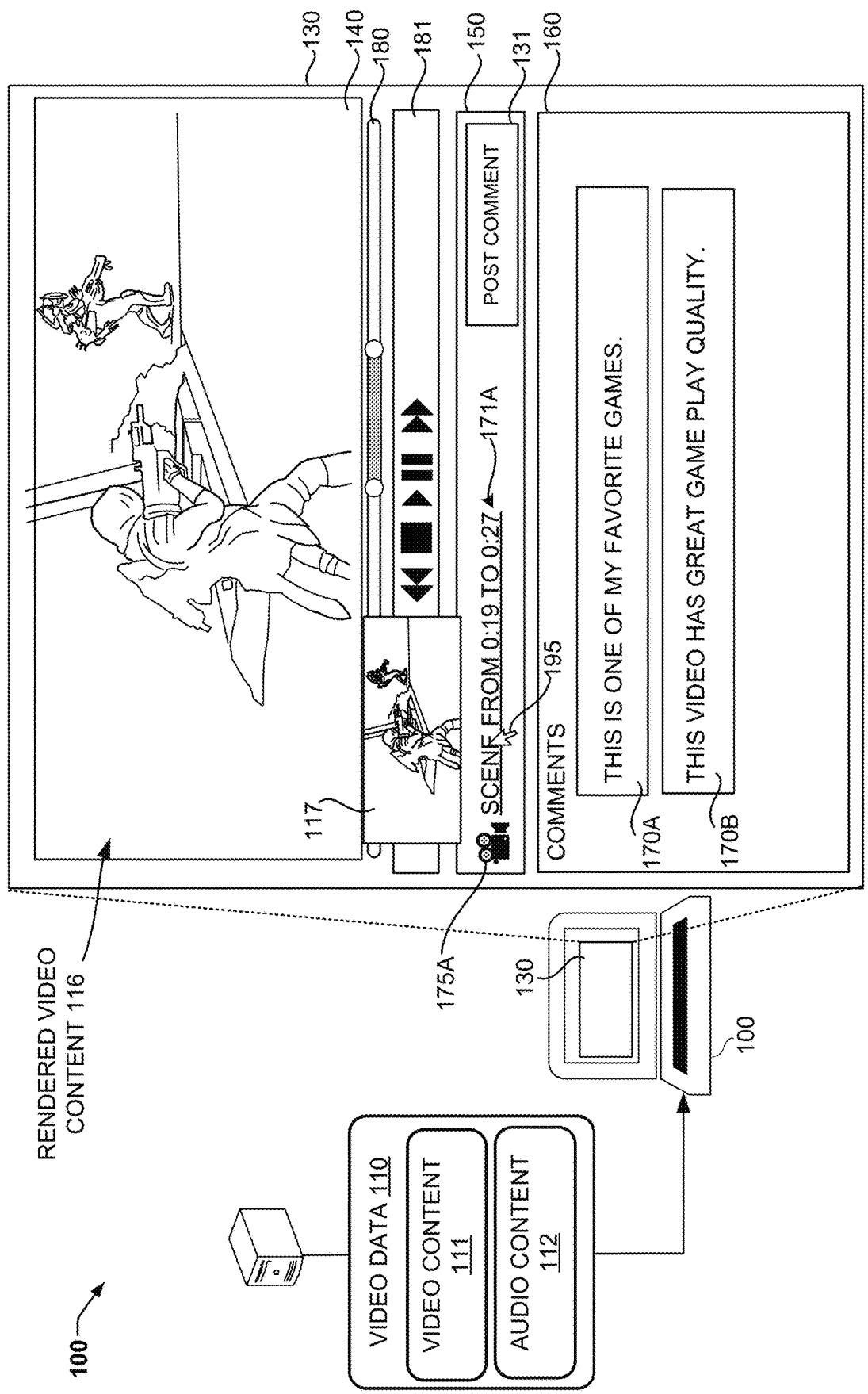
FIG. 1B is a combined system and UI diagram that shows additional aspects of the system illustrated in FIG. 1A, according to one embodiment disclosed herein.

As shown in FIG. 1A, the disclosed computing system 100 can cause a display of a UI 130 on a display screen. In the illustrated embodiment, the UI 130 includes a video display area 140, a text entry field 150, and a comment section 160. The system 100 can receive video data 110 having video content 111 and audio content 112. As will be described in greater detail below, the video data 110 might also include closed caption text that defines phrases that are associated with a timeline of the video content 111 and the audio content 112.

The comment section 160, which might be referred to herein as a "text field 160" or a "text section 160," of the UI 130 is configured to enable users to provide comments 170A and 170B relating to content rendered in the video display area 140. The comments 170 can include text and/or other types of user-provided content. As will be described in greater detail below, the comment section 160 can also present comments 170 that include typed hyperlinks.

The comment section 150 can include any section of a user interface comprising text. For instance, the comment section 150 one can be a part of a word processing document, a note-taking application file, a spreadsheet, a blog, or any other form of media or data that can cause a computer to render text in conjunction with a rendering of a video.

The system 100 can process the video content 111 to generate rendered video content 116 for display within the video display area 140. In addition, the system 100 can process the audio content 112 to generate a rendering of the audio content 112 through an endpoint device, such as a speaker. The rendered video content 116 can also include closed caption text for the video content 111, if available. The UI 130 can also include transport controls 181 for controlling playback of the rendered video content 116.

The UI 130 can also provide UI controls for selecting a portion of the rendered video content 116. In the example shown in FIG. 1A, for instance, a UI control 185 is provided for selecting an interval of the rendered video content 116. In this example, the UI control 185 includes two slider controls located on a seek bar 180. The seek bar 180 provides a visual indication of the length of the rendered video content 116. The slider controls can be moved along the seek bar 180 to specify an interval of the rendered video content 116. The left slider control specifies the start of the interval and the right slider specifies the end of the interval. In the illustrated example, a user has selected an interval between 0:19 (mins:secs) and 0:27 of the rendered video content 116.

When a user selects an interval in the rendered video content 116 using the UI control 185, the system 100 can display a UI control 190. When the UI control 190 is selected, such as by placing a mouse cursor 195 on the UI control 190 and clicking a mouse button or by tapping on a touchscreen, the system 100 generates a typed hyperlink 171 and places the typed hyperlink 171 in the text entry area 150. In the example shown in FIG. 1A, a typed hyperlink 171A has been generated in response to the selection of the UI control 190 that includes data referencing the selected portion of the rendered video content 116 (i.e. the interval selected with the UI control 185).

In one embodiment, the UI control 190 is displayed adjacent to the UI control 185. The UI control 190 for generating a typed hyperlink 171 can, however, be located in other areas of the UI 130 in other configurations. In this regard, it is to be appreciated that the arrangement of the UI 130 and the specific UI controls described in the examples presented herein are illustrative and that other arrangements and types of UI controls can be utilized to provide the disclosed functionality.

As discussed briefly above, a typed link 171 can also include data identifying the content type of the selected portion of the rendered video content 116. In the illustrated example, for instance, the typed link 171A includes data indicating that the referenced content is an interval of the rendered video content 116. In this example, the typed link 171A also includes data that identifies the referenced interval (i.e. 0:19 to 0:27).

A typed link 171 can also specify default link text. In the illustrated example, for instance, the default link text is "SCENE FROM [interval]", where [interval] specifies the interval of the referenced rendered video content 116. The link text is user-editable in some configurations. For instance, UI controls might be provided through which a user can replace the link text "SCENE FROM [interval]" with their own text. A typed link 171 can include other types of information in other configurations.

A visual indicator 175 can also be presented adjacent to a typed link 171 that graphically indicates the type of content referenced by the typed link 171. In the illustrated example, for instance, a visual indicator 175A is displayed that visually indicates that the referenced content type is video content.

In some embodiments, user selection of a typed link 171 (e.g. by hovering a mouse cursor 195 over the link 171) in the text entry field 150 will cause the disclosed system 100 to present a preview of the portion of the video content 111 referenced by the typed link 171. In the illustrated example, for instance, a preview has been presented in response to the mouse cursor 195 being placed over the typed link 171A in the text entry field 150. In this case, the preview is a thumbnail preview 117 of the portion of content referenced by the typed link 171A. The preview is presented adjacent to the typed link 171 in the text entry field 150 in some configurations but can be displayed in other locations in the UI 130 in other configurations.

User selection of a typed link 171 can be based on a user interaction with a touchscreen or any other mechanism suitable for selecting a link 171. In some configurations, the user input can be a voice command received by a microphone of the computing device 100. In some configurations, the user input can be received by a camera or imaging sensor of the computing device. Such an embodiment allows a user to provide a gesture to select a link 171. For example, a user can point to a particular link within a user interface. It can also be appreciated that the selection of a link 171 can include the selection of at least a portion of a comment. Thus, if a user selects a word or any other symbol or character associated with a displayed video, such a user input can cause the computing device 100 to perform one or more actions such as a display of a video, rendering of an audio output or display of other types of media, such as a still image or other graphical elements.

In some embodiments, a UI control 131 for creating a new comment 170 that includes a typed hyperlink 171 in the comment section 160 of the UI 130 is presented within or adjacent to the text entry field 140. This UI control 131 can be presented in other locations in the UI 130 in other configurations. When the disclosed system 100 detects user selection of this UI control 131 (e.g. by tapping on a touch screen), the system 100 can create a new comment 170 and display the new comment 170 in the comment section 160 of the UI 130. The new comment 170 includes the typed link 171 from the text entry field 150 and, potentially, other content from the text entry field 150, such as user-provided text.

Figure 1C:
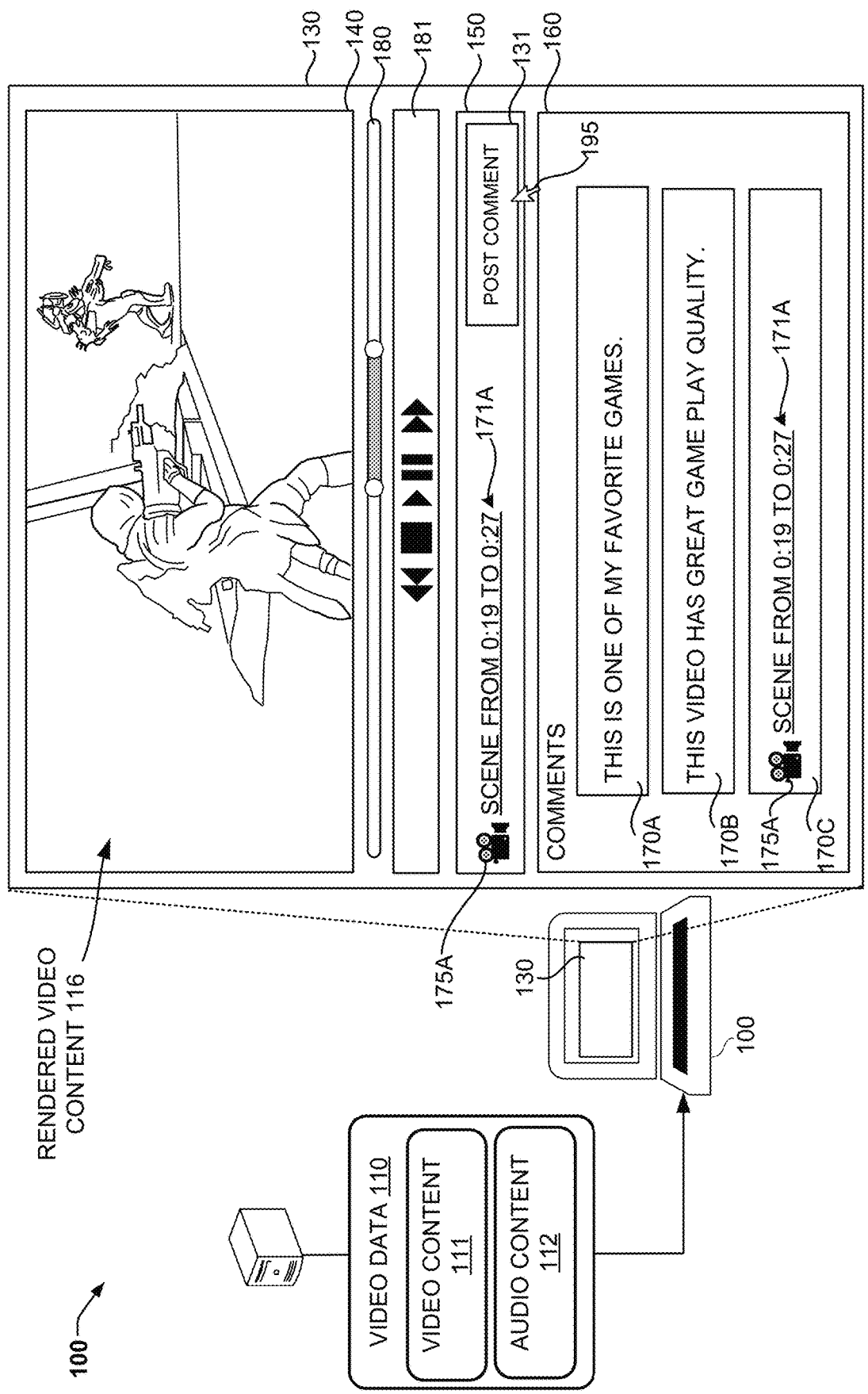
FIG. 1C is a combined system and UI diagram that shows additional aspects of the system illustrated in FIG. 1A, according to one embodiment disclosed herein.

In the example shown in FIG. 1C, a user has selected the UI control 131. In response thereto, the system 100 has inserted a comment 170C into the comment section 160 of the UI 130. The new comment 170C includes the typed hyperlink 171A from the text entry field 150. The typed hyperlink 171A is removed from the text entry field 150 when the new comment 170C is created. In the illustrated configuration, the visual indicator 175A is also included in the new comment 170C.

Figure 1D:
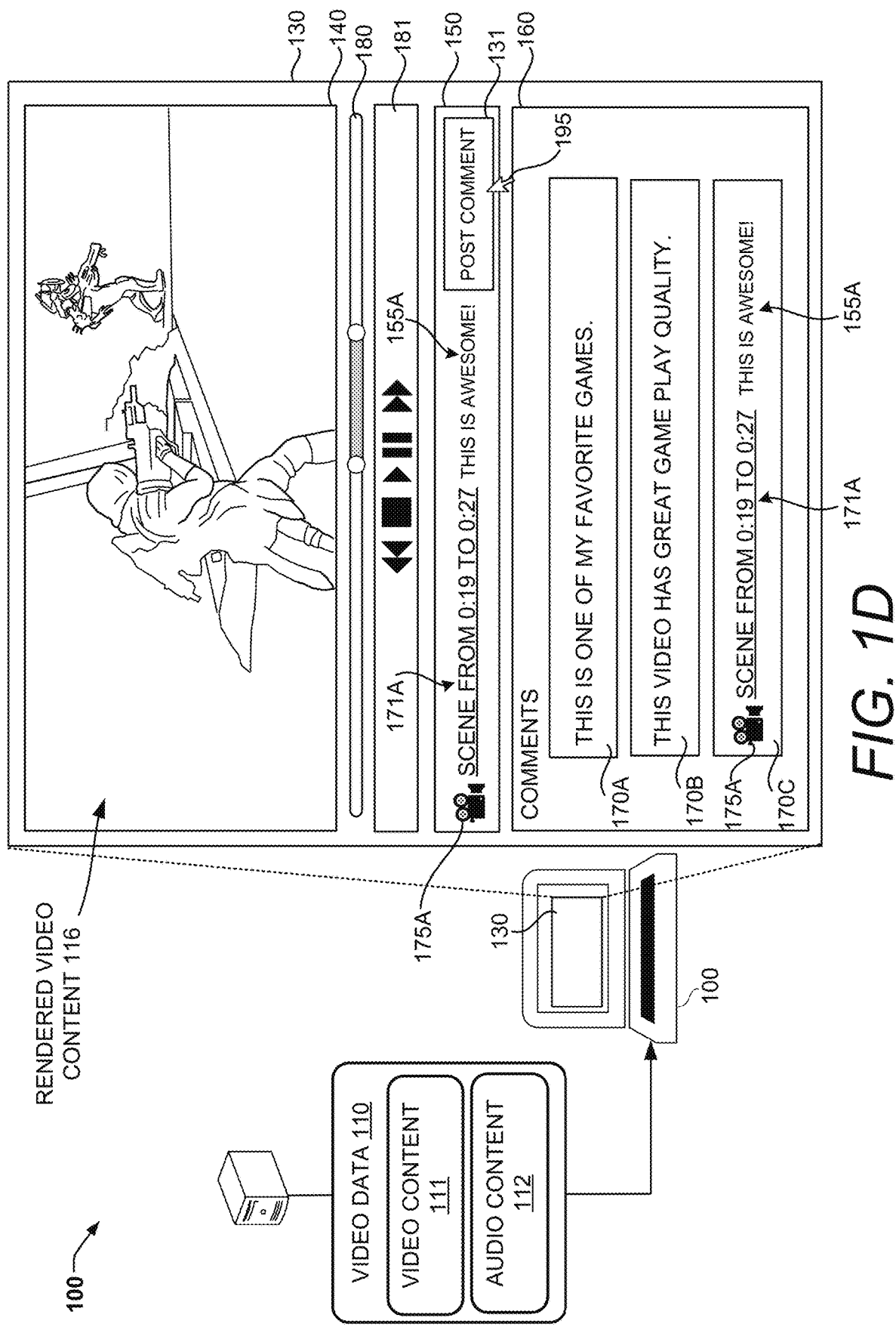
FIG. 1D is a combined system and UI diagram that shows additional aspects of the system illustrated in FIG. 1A, according to one embodiment disclosed herein.

As shown in FIG. 1D, a user can also provide text 155 in the text entry field 150. This text 155 is included in a new comment 170 when a user selects the UI control 131. In the illustrated example, for instance, the text 155A "THIS IS AWESOME!" has been entered into the text entry field 150. When the user selects the UI control 131, the new comment 170C is created, which includes the specified text. A user might be permitted to add other types of content to a comment in other configurations.

As discussed briefly above, the default link text for a typed hyperlink 171 is user-editable in some configurations. In the example shown in FIG. 1E, for instance, a user has changed the default link text from "SCENE FROM [interval]" to "CHECK OUT THIS PART!" The typed link 171A is then posted to the new comment 170C with the user-edited link text.

As also discussed briefly above, the disclosed system 100 also provides functionality for de-referencing the video content referred to by a typed link 171 in the comments section 160 of the UI 130. For instance, in one configuration a user can select a typed link 171 in a comment 170, such as by hovering a mouse cursor 195 over the typed link 171. In response thereto, the disclosed system 100 can determine the content type for the portion of the video content referenced by the typed link 171 based on the data in the link 171 described above. The disclosed system 100 can then present a preview of the referenced portion of the video content based upon the determined content type for the portion. The preview is presented adjacent to the selected typed link 171 in the comment 170 in some configurations, but can be displayed in other locations in the UI 130 in other configurations.

In the example illustrated in FIG. 1F, for instance, a preview has been presented in response to the mouse cursor 195 being placed over the typed link 171A in the comment 170C. In this case, the preview is a thumbnail preview 117 of the portion of the rendered video referenced by the typed link 171A in the comment 170C. The preview is presented adjacent to the typed link 171 in a comment 170 in some configurations, but can be displayed in other locations in the UI 130 in other configurations.

Turning now to FIGS. 2A-2F, details will be provided regarding another embodiment of the mechanisms described above. In the examples shown in these FIGURES, the portion of content referenced by a typed hyperlink 171 is a portion 201 of a frame of the rendered video content 116. In this embodiment, UI controls are provided through which a user can select a portion 201 of a frame of the rendered video content 116. For instance, a user might be able to select and "drag" to create a rectangle (or other shape) over a frame of the rendered video content 116 that defines the portion 201.

In some embodiments, the selected portion 201 of a frame includes an object. For instance, in the illustrated example, a user has selected a portion of a frame of the rendered video content 116 that includes an in-game character. Other types of objects can be selected in a similar manner in other configurations.

As in the example described above with regard to FIGS. 1A-1F, a UI control 190 can be presented adjacent to the selected portion of the rendered video content 116. Selection of the UI control 190 will cause a typed hyperlink 171B to be generated and placed in the text entry field 150. A visual indicator 175B is also presented in the text entry field 150 that identifies the type of the referenced content, an image of a portion of a frame of the rendered video content 116 in this example.

The typed hyperlink 171B references the portion 201 of the frame of the rendered video content 116 and includes data identifying the content type (i.e. a portion of a frame). The typed hyperlink 171B for a portion of a frame can also include other types of data such as, for instance, data identifying the frame (e.g. a timestamp) or default link text identifying a time associated with a frame of video from which the portion 201 was taken. In the illustrated example, the default link text is "LOOK AT THIS [frame timestamp]", where the frame timestamp identifies the frame of the rendered video content 116 from which the portion 201 was taken. The link text is user-editable in some configurations.

Figure 2A:
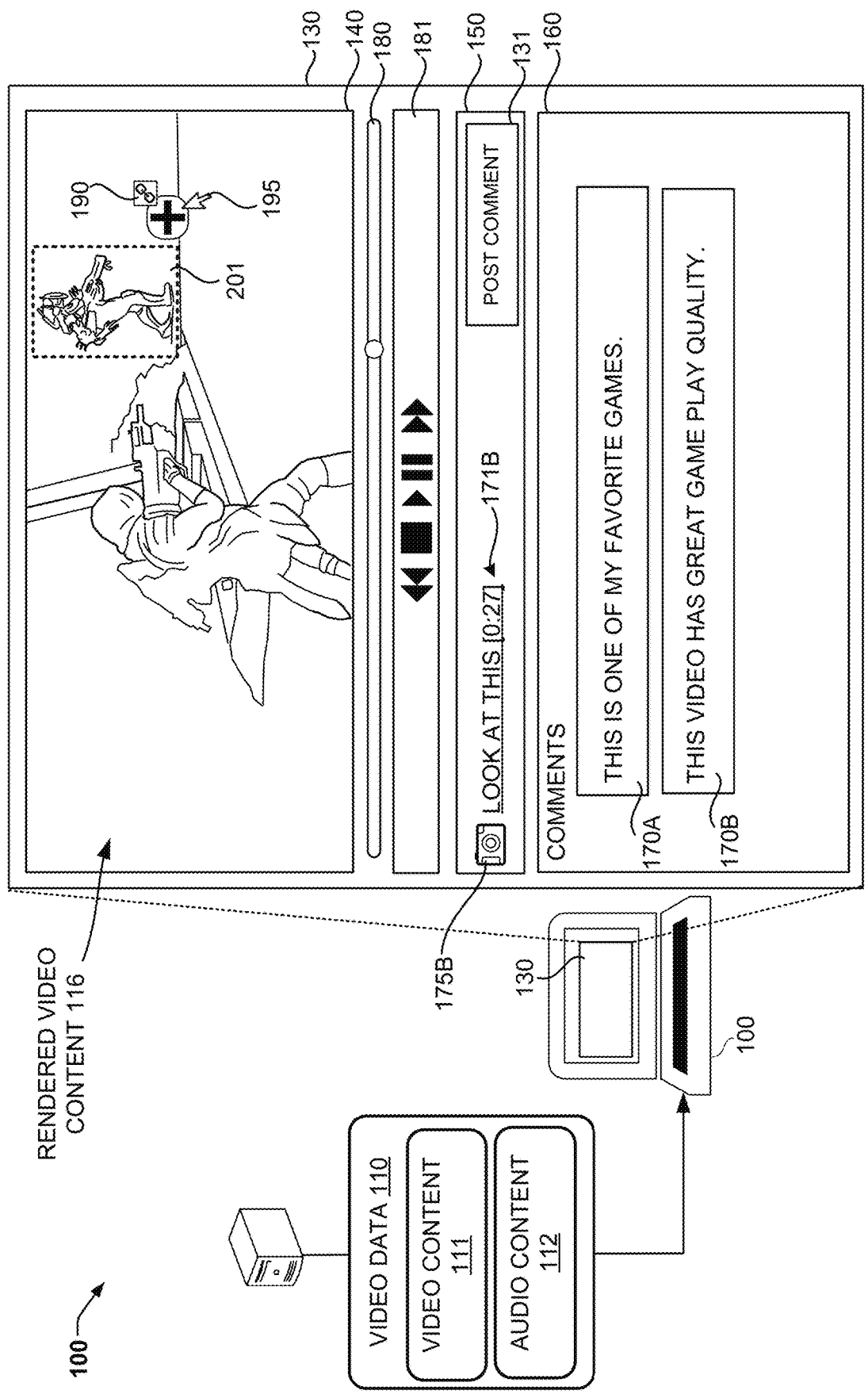
FIG. 2A is a combined system and UI diagram that shows additional aspects of the system illustrated in FIG. 1A, according to one embodiment disclosed herein.
Figure 2B:
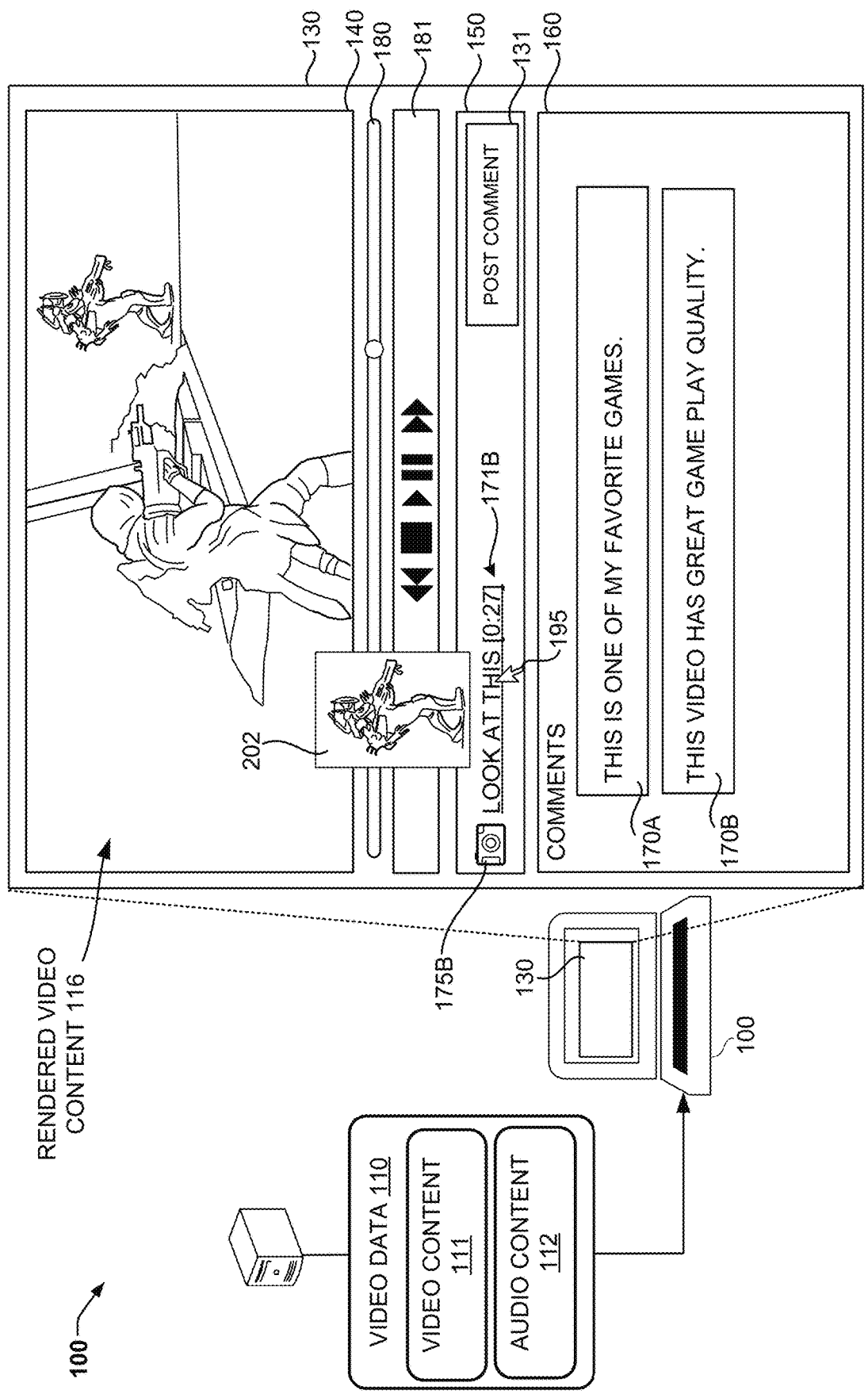
FIG. 2B is a combined system and UI diagram that shows additional aspects of the system illustrated in FIG. 1A, according to one embodiment disclosed herein.

As shown in FIG. 2B, a preview of the portion 201 of the frame of the rendered video content 116 can be displayed when the typed hyperlink 171B is selected (e.g. by hovering the mouse cursor 195 over the typed hyperlink 171B). In this example, for instance, a thumbnail preview 202 of the region 201 is presented adjacent to the typed hyperlink 171B. The thumbnail preview 202 or other type of preview can be presented in other locations in other configurations.

As in the example described above, when the disclosed system 100 detects user selection of the UI control 131 (e.g. by tapping on a touch screen), the system 100 can create a new comment 170 and display the new comment 170 in the comment section of the UI 130. The new comment 170 includes the typed link 171 from the text entry field 150 and, potentially, other content from the text entry field 150, such as user-provided text.

Figure 2C:
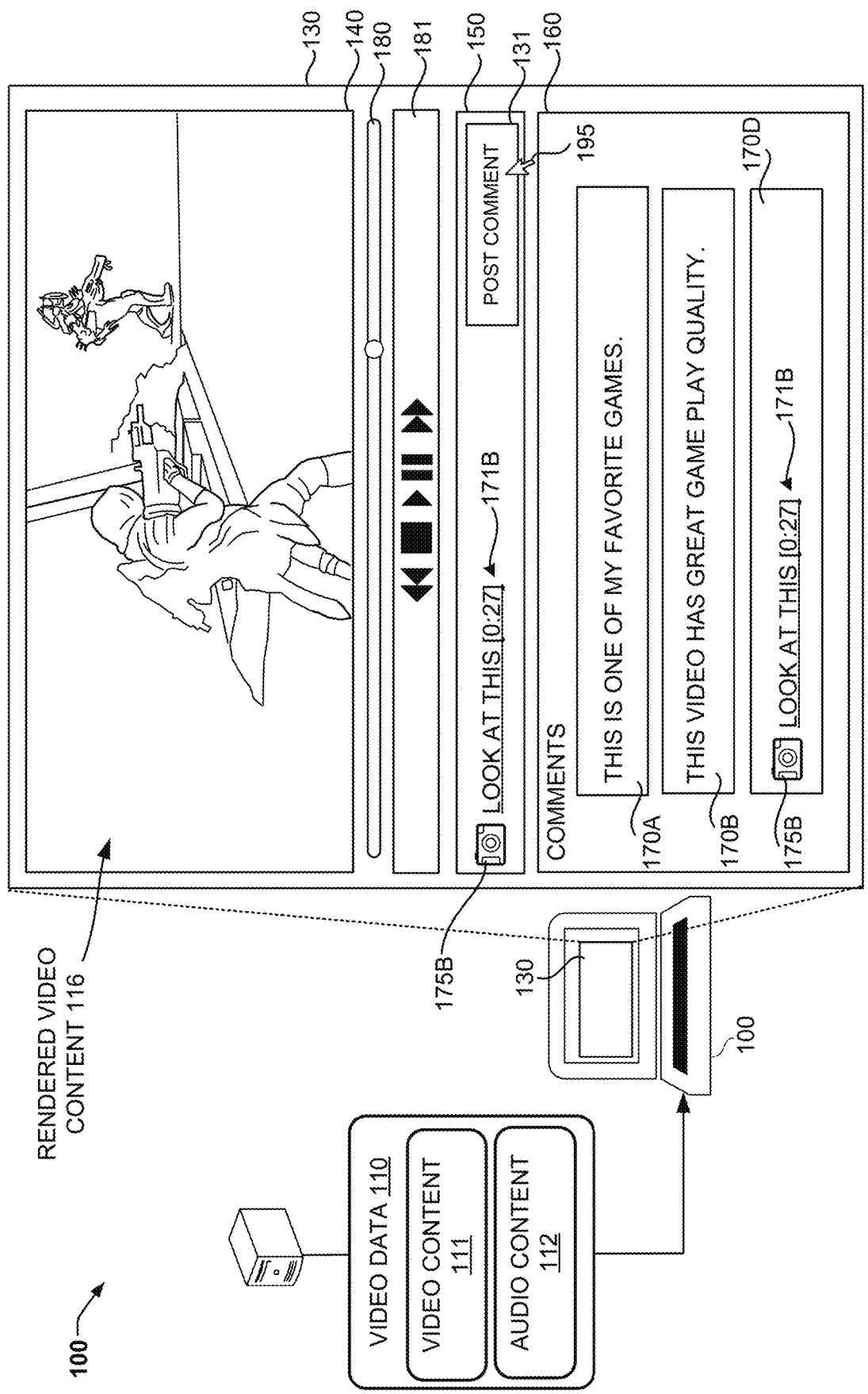
FIG. 2C is a combined system and UI diagram that shows additional aspects of the system illustrated in FIG. 1A, according to one embodiment disclosed herein.

In the example shown in FIG. 2C, for instance, a user has selected the UI control 131. In response thereto, the system 100 has inserted a new comment 170D into the comment section 160 of the UI 130. The new comment 170D includes the typed hyperlink 171B from the text entry field 150. The typed hyperlink 171B is removed from the text entry field 150 when the new comment 170D is created. In the illustrated configuration, the visual indicator 175B is also included in the new comment 170D.

Figure 2D:
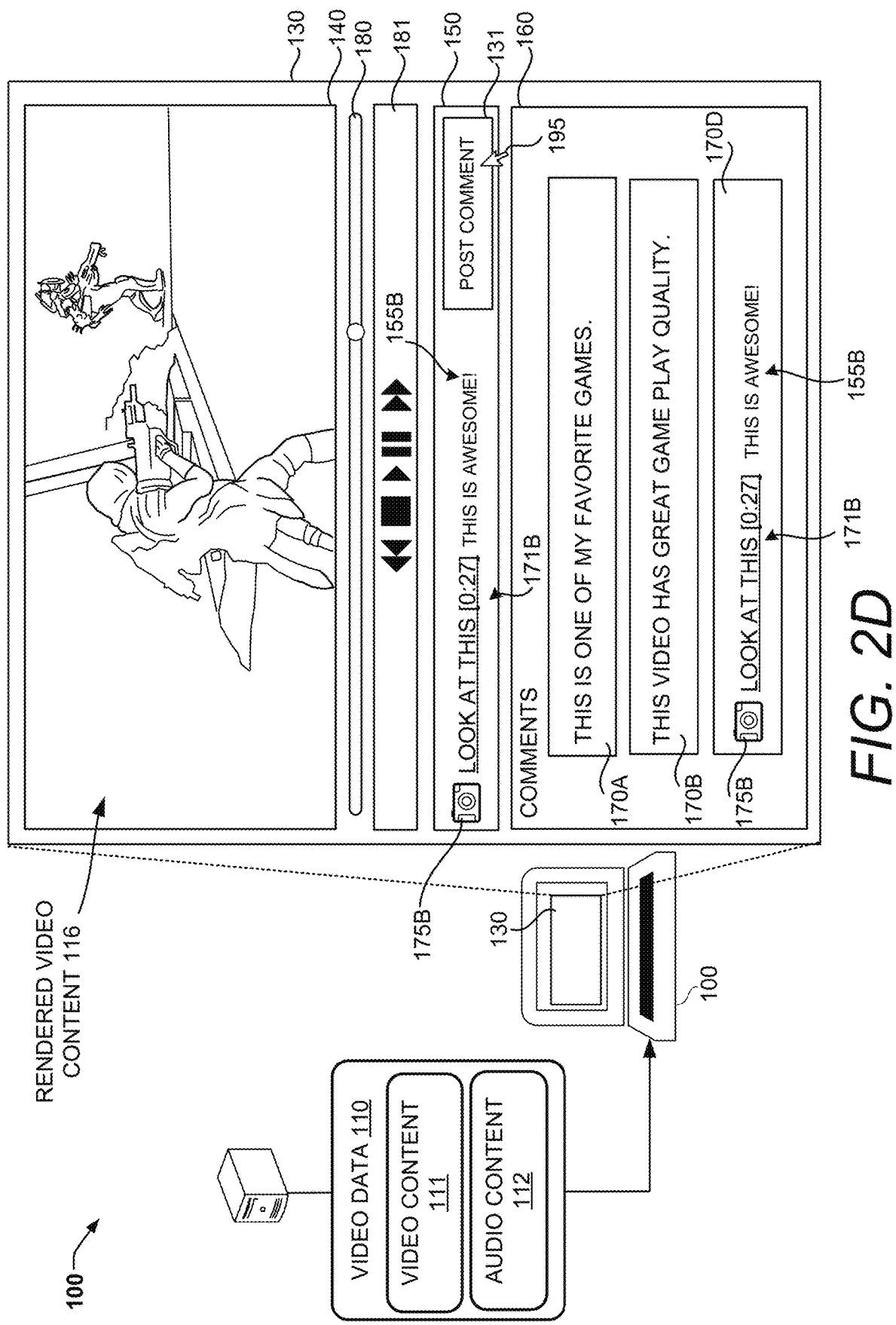
FIG. 2D is a combined system and UI diagram that shows additional aspects of the system illustrated in FIG. 1A, according to one embodiment disclosed herein.
Figure 2E:
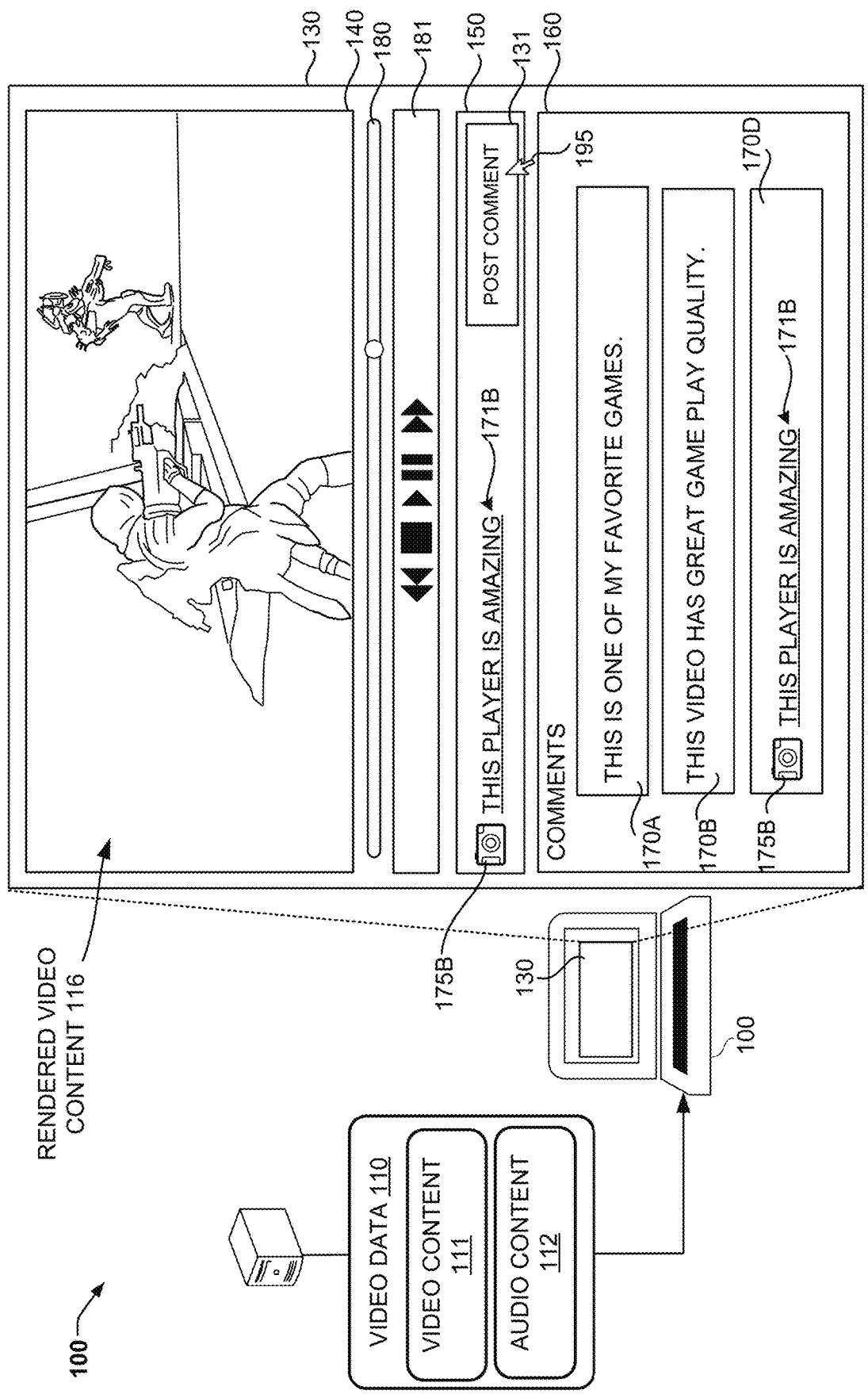
FIG. 2E is a combined system and UI diagram that shows additional aspects of the system illustrated in FIG. 1A, according to one embodiment disclosed herein.

As shown in FIG. 2D, a user can also provide text 155 in the text entry field 150. This text 155 is included in a new comment 170 when a user selects the UI control 131. In the illustrated example, for instance, the text 155B "THIS IS AWESOME!" has been entered into the text entry field 150. When the user selects the UI control 131, the new comment 170D is created, which includes the specified text. A user might be permitted to add other types of content to a comment in other configurations.

As discussed briefly above, the default link text for a typed hyperlink 171 is user-editable in some configurations. In the example shown in FIG. 2E, for instance, a user has changed the default link text from "LOOK AT THIS [frame timestamp]" to "THIS PLAYER IS AMAZING." The typed link 171B is then posted to the new comment 170D with the user-edited link text.

As also discussed above, a user can select a typed link 171 in a comment 170, such as by hovering a mouse cursor 195 over the typed link 171. In response thereto, the disclosed system 100 can determine the content type for the portion of the video content referenced by the typed link 171 based on the data in the link described above. The disclosed system 100 can then present a preview of the referenced portion of the video content based upon the determined content type for the portion. The preview is presented adjacent to the selected typed link 171 in the comment 170 in some configurations, but can be displayed in other locations in the UI 130 in other configurations.

Figure 2F:
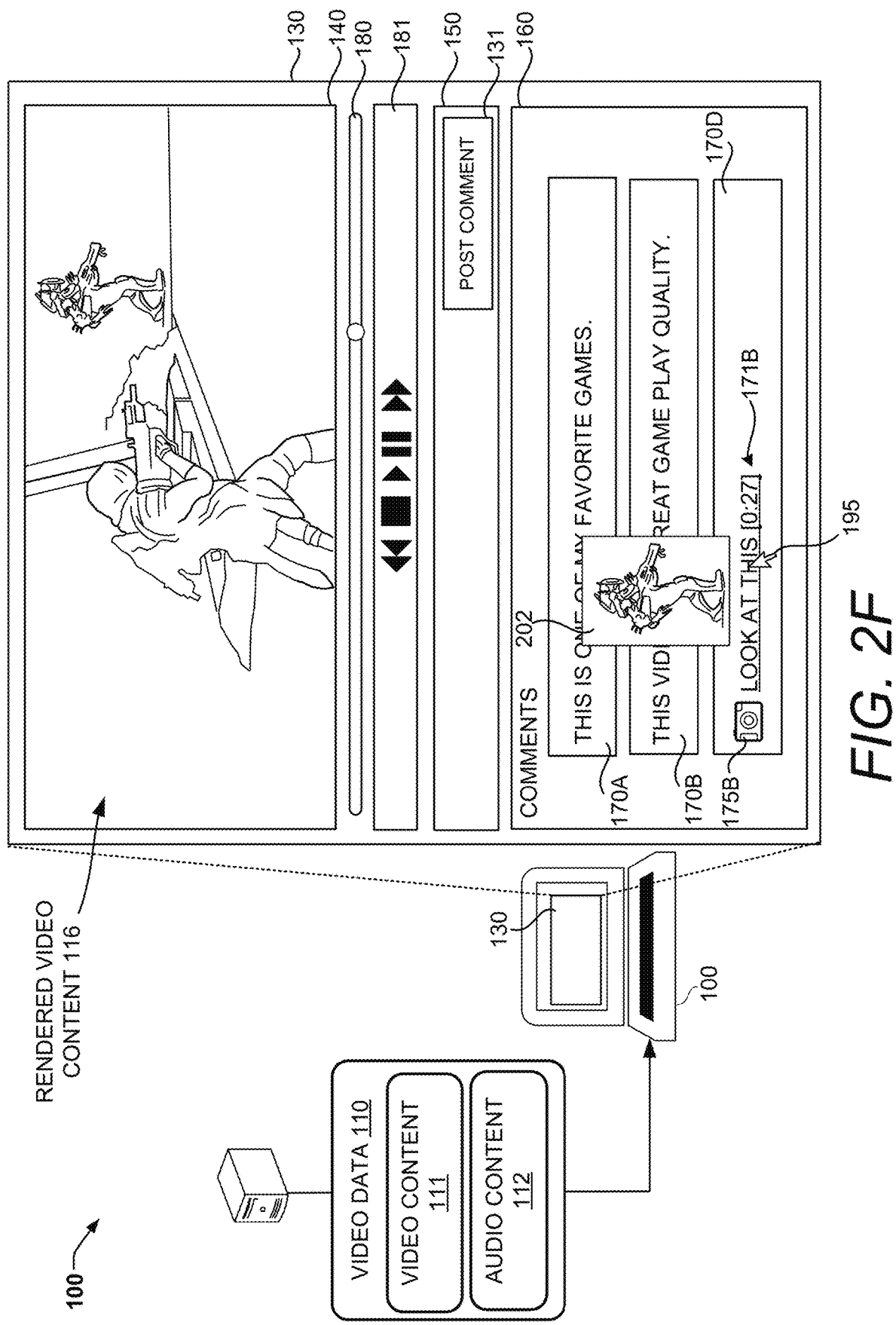
FIG. 2F is a combined system and UI diagram that shows additional aspects of the system illustrated in FIG. 1A, according to one embodiment disclosed herein.

In the example illustrated in FIG. 2F, for instance, a preview of the content referenced by the typed hyperlink 171B has been displayed in response to the mouse cursor 195 being placed over the typed link 171B in the comment 170D. In this example, for instance, a thumbnail preview 202 of the region 201 is presented adjacent to the typed hyperlink 171B. The thumbnail preview 202 or other type of preview can be presented in other locations in other configurations.

Turning now to FIGS. 3A-3E, details will be provided regarding another embodiment of the mechanisms described above. In the examples shown in these FIGURES, the portion of content referenced by a typed hyperlink 171 is text content 113 in the form of closed caption text. The closed caption text is rendered with the video content 111 and presented in the UI 130 as rendered video content 116. For instance, in the illustrated example, closed caption text 301 has been presented in the UI 130.

In this embodiment, UI controls are provided through which a user can select all or a portion of the closed caption text 301 for a frame of the rendered video content 116. In the illustrated example, a user has selected the portion 302 (i.e. "HE'S BEHIND YOU!") of the closed caption text 301 (i.e. "LOOKOUT! HE'S RIGHT BEHIND YOU!").

As in the examples described above, a UI control 190 can be presented adjacent to the selected portion 302 of the closed caption text 301. Selection of the UI control 190 will cause a typed hyperlink 171C to be generated and placed in the text entry field 150. A visual indicator 175C is also presented in the text entry field 150 that identifies the type of the referenced content, an image of a speech bubble in this example.

The typed hyperlink 171C references the portion 302 of the closed caption text 301 and includes data identifying the content type (i.e. closed caption text). The typed hyperlink 171C for the portion 302 of the closed caption text 301 can also include other types of data such as, for instance, data identifying the frame of the rendered video content 116 from which the closed caption text was taken or the text of the portion 302 of the closed caption text 301.

Figure 3A:
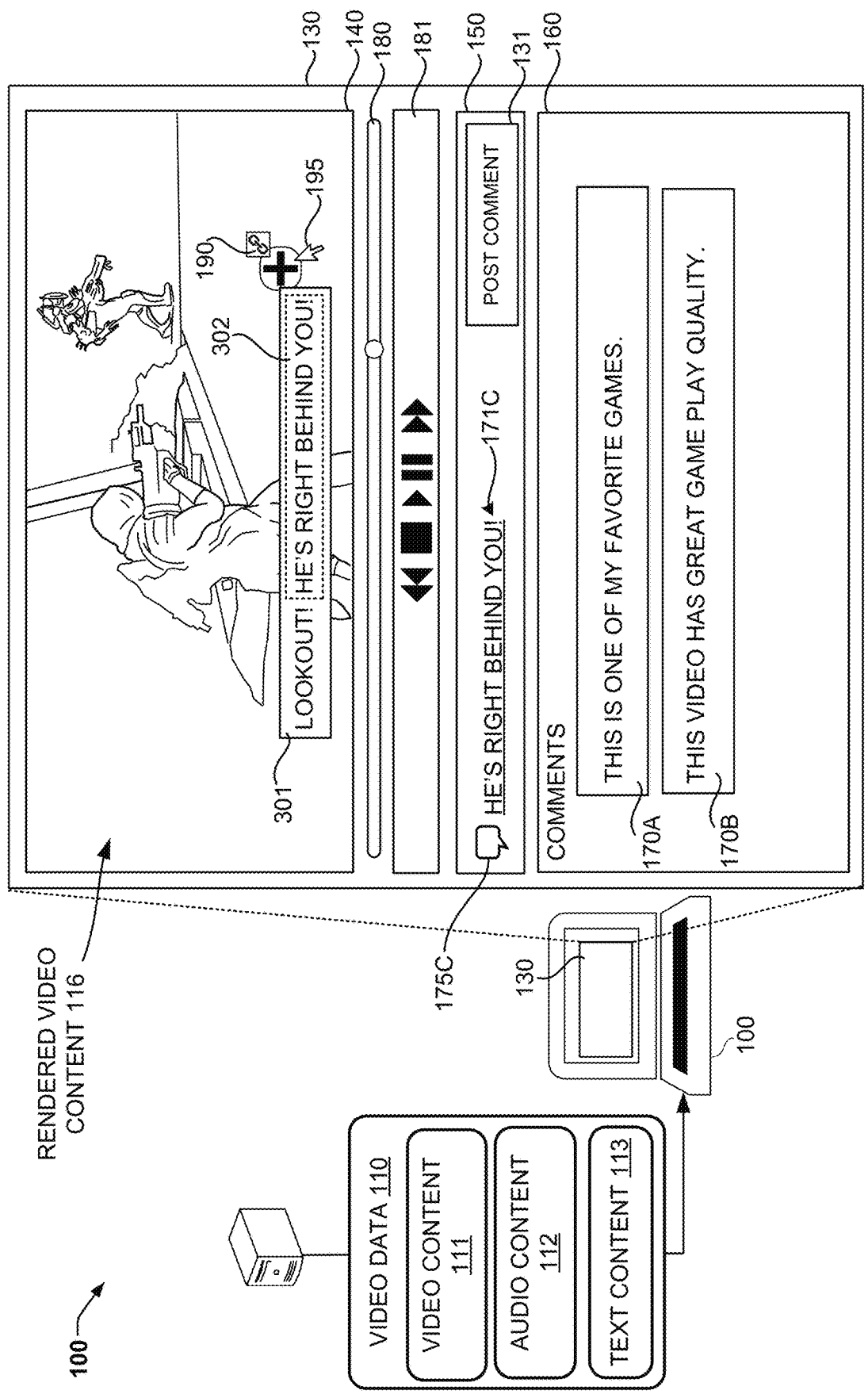
FIG. 3A is a combined system and UI diagram that shows additional aspects of the system illustrated in FIG. 1A, according to one embodiment disclosed herein.
Figure 3B:
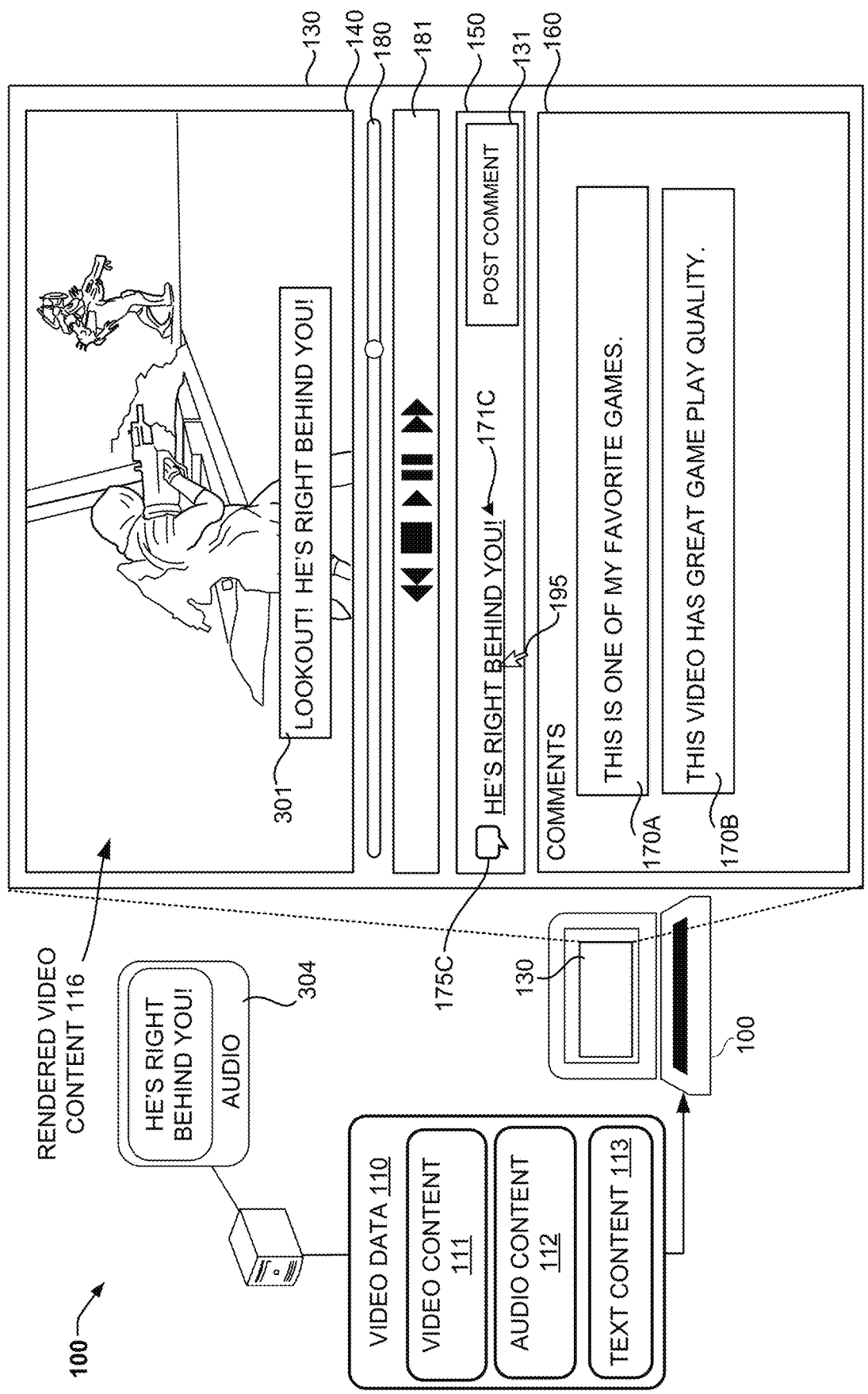
FIG. 3B is a combined system and UI diagram that shows additional aspects of the system illustrated in FIG. 1A, according to one embodiment disclosed herein.

As shown in FIG. 3B, a preview of the selected portion 302 of the closed caption text 301 can be provided when the typed hyperlink 171C is selected (e.g. by hovering the mouse cursor 195 over the typed hyperlink 171C). In this example, for instance, the portion 301 of the closed caption text 302 can be converted to speech and the audio of 302 of the speech can be played back by the system 100.

As in the examples described above, when the disclosed system 100 detects user selection of the UI control 131 (e.g. by tapping on a touch screen), the system 100 can create a new comment 170 and display the new comment 170 in the comment section of the UI 130. The new comment 170 includes the typed link 171 from the text entry field 150 and, potentially, other content from the text entry field 150, such as user-provided text.

Figure 3C:
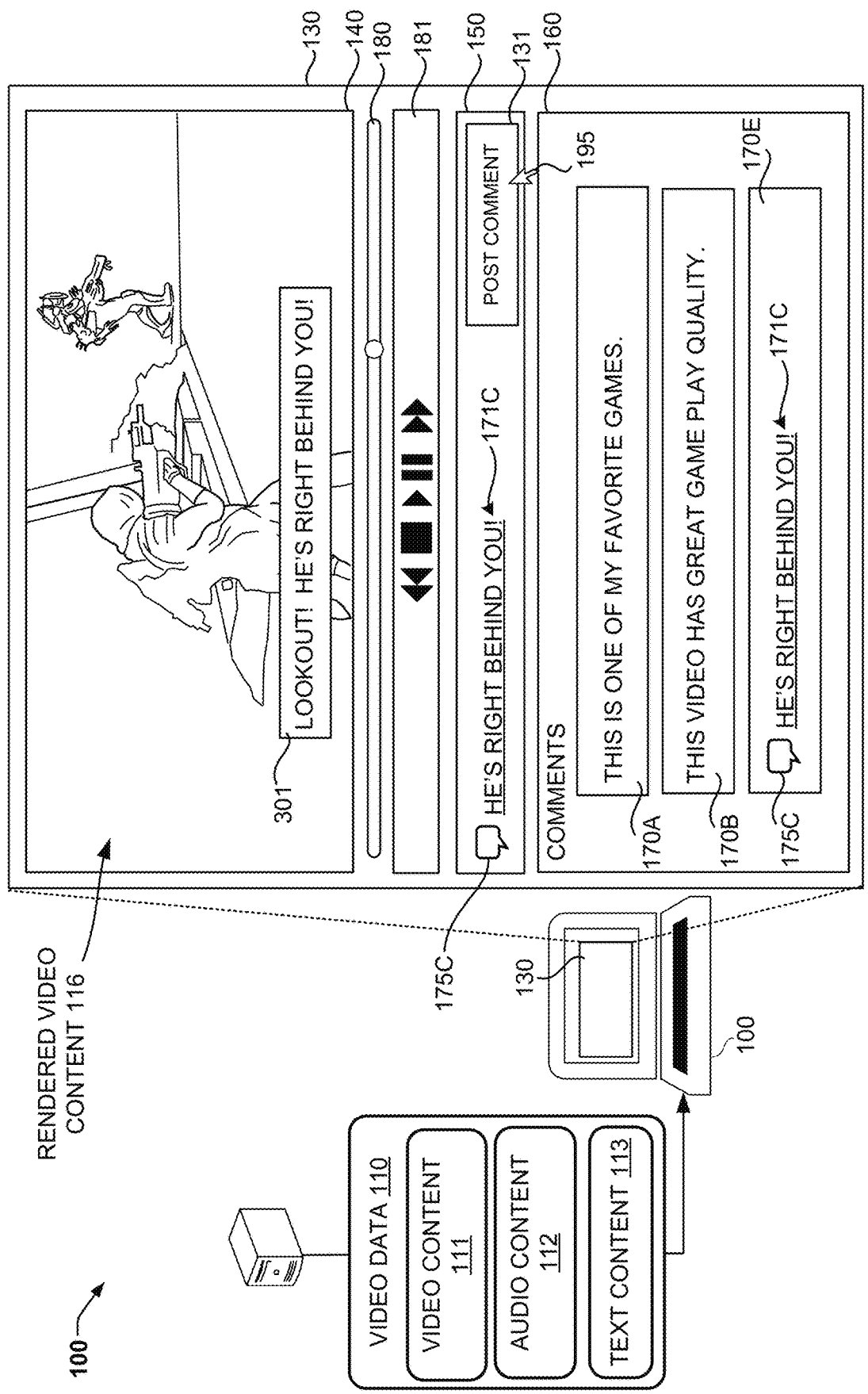
FIG. 3C is a combined system and UI diagram that shows additional aspects of the system illustrated in FIG. 1A, according to one embodiment disclosed herein.

In the example shown in FIG. 3C, for instance, a user has selected the UI control 131. In response thereto, the system 100 has inserted a new comment 170E into the comment section 160 of the UI 130. The new comment 170E includes the typed hyperlink 171C from the text entry field 150. The typed hyperlink 171C is removed from the text entry field 150 when the new comment 170E is created. In the illustrated configuration, the visual indicator 175C is also included in the new comment 170E.

Figure 3D:
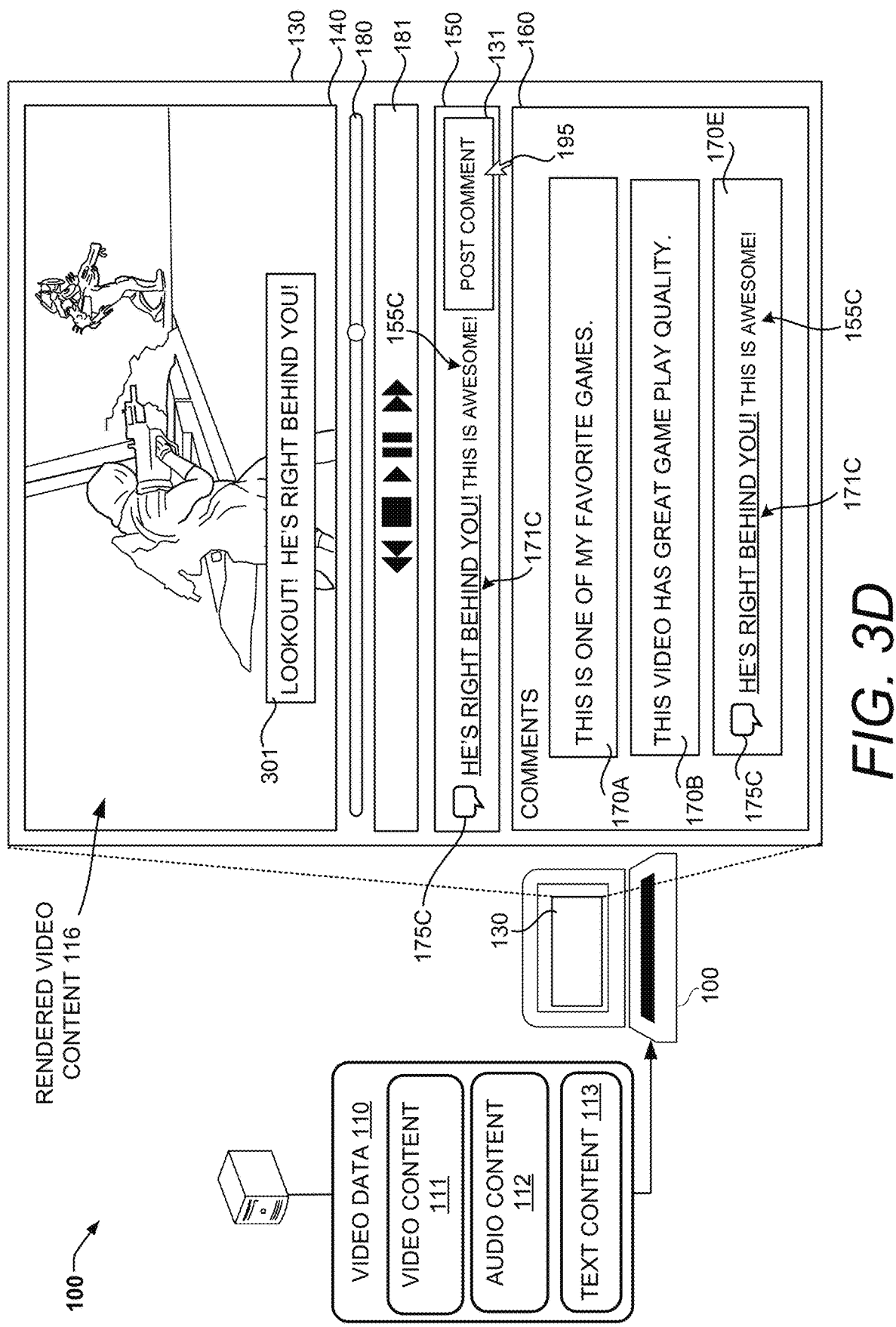
FIG. 3D is a combined system and UI diagram that shows additional aspects of the system illustrated in FIG. 1A, according to one embodiment disclosed herein.

As shown in FIG. 3D, a user can also provide text 155 in the text entry field 150. This text 155 is included in a new comment 170 when a user selects the UI control 131. In the illustrated example, for instance, the text 155C "THIS IS AWESOME!" has been entered into the text entry field 150. When the user selects the UI control 131, the new comment 170E is created, which includes the specified text. A user might be permitted to add other types of content to a comment in other configurations.

As also discussed above, a user can select a typed link 171 in a comment 170, such as by hovering a mouse cursor 195 over the typed link 171. In response thereto, the disclosed system 100 can determine the content type for the portion of the video content referenced by the typed link 171 based on the data in the link described above. The disclosed system 100 can then present a preview based upon the determined content type for the portion.

Figure 3E:
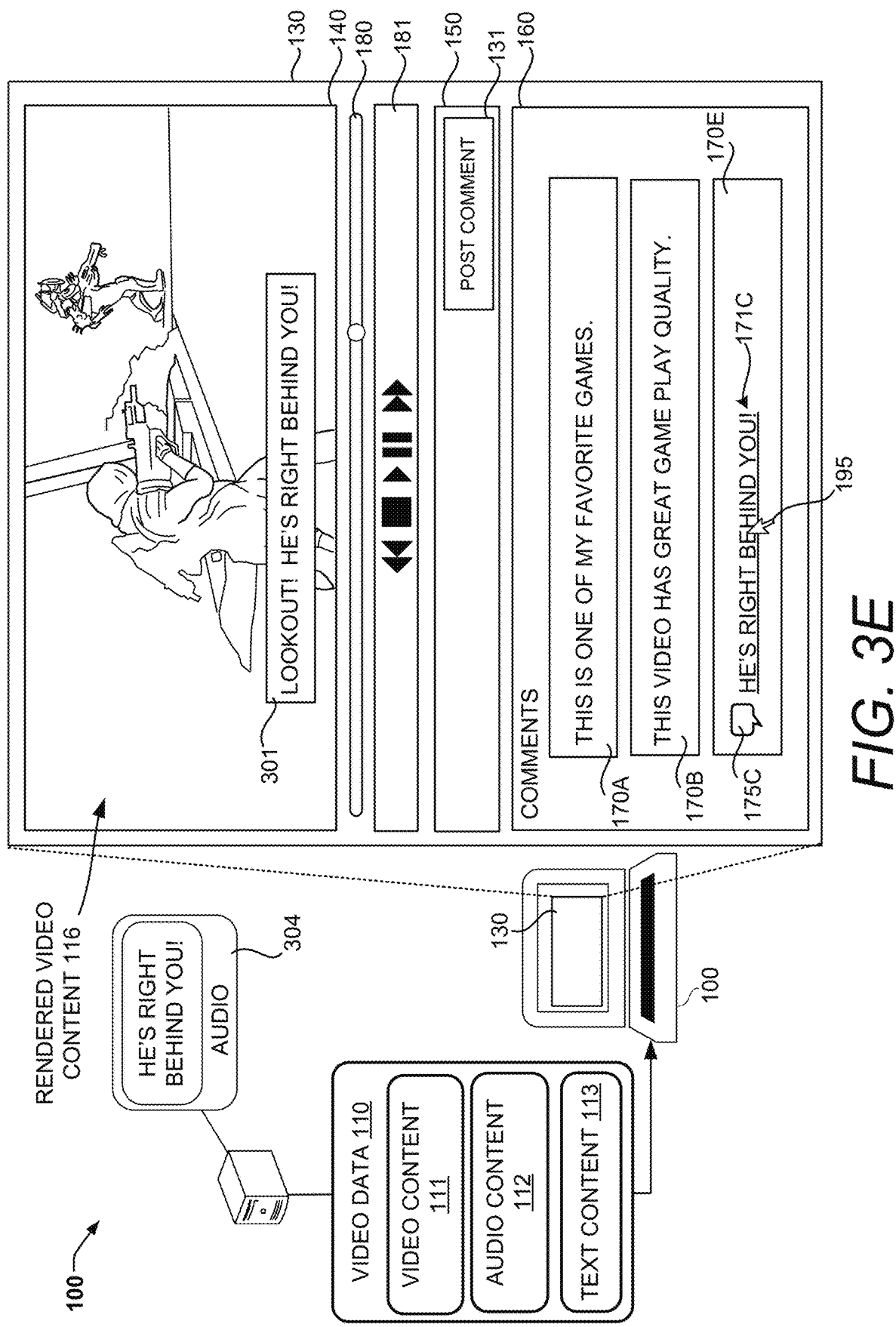
FIG. 3E is a combined system and UI diagram that shows additional aspects of the system illustrated in FIG. 1A, according to one embodiment disclosed herein.

In the example illustrated in FIG. 3E, for instance, a preview of the portion 302 of the closed caption text 302 referenced by the typed hyperlink 171C is provided in response to the mouse cursor 195 being placed over the typed link 171C in the comment 170E. As discussed above, the preview in this example is generated by converting the closed caption text referenced by the typed link 171C to speech and playing the audio 304 of the speech.

FIGS. 4A-4D illustrate how multiple typed hyperlinks 171 and multiple instances of text 155 can be placed in a comment 170. In the example shown in these FIGURES, a user has inserted typed links 171A-171C in the text entry field 150 in the manner described above with regard to FIGS. 1A-3E. In this example, the user has also typed text 155D, 155E, and 155F into the text entry field 150 with the typed links 171A-171C, respectively. As shown, the text 155 and links 171 can be inserted into the text entry field 150 in any order. As in the examples described above, the content referred to by the typed hyperlinks 171 can be previewed in the text entry field 150 prior to posting a new comment.

In the illustrated example, a user has also selected the UI control 131 which, in turn, has caused a new comment 170F to be placed in the comment section 160 of the UI 130. The new comment 170F includes the typed hyperlinks 171A-171C and the text 155D, 155E, and 155F from the text entry field 150.

As in the examples described above, the typed hyperlinks 171 in the new comment 170F can be used to de-reference the associated content. For instance, in the example shown in FIG. 4B, a preview can be presented in response to the mouse cursor 195 being placed over the typed link 171A in the new comment 170F. In this case, the preview is a thumbnail preview 117 of the portion of content referenced by the typed link 171A. The preview is presented adjacent to the typed link 171 in the comment 170F in some configurations but can be displayed in other locations in the UI 130 in other configurations.

Figure 4A:
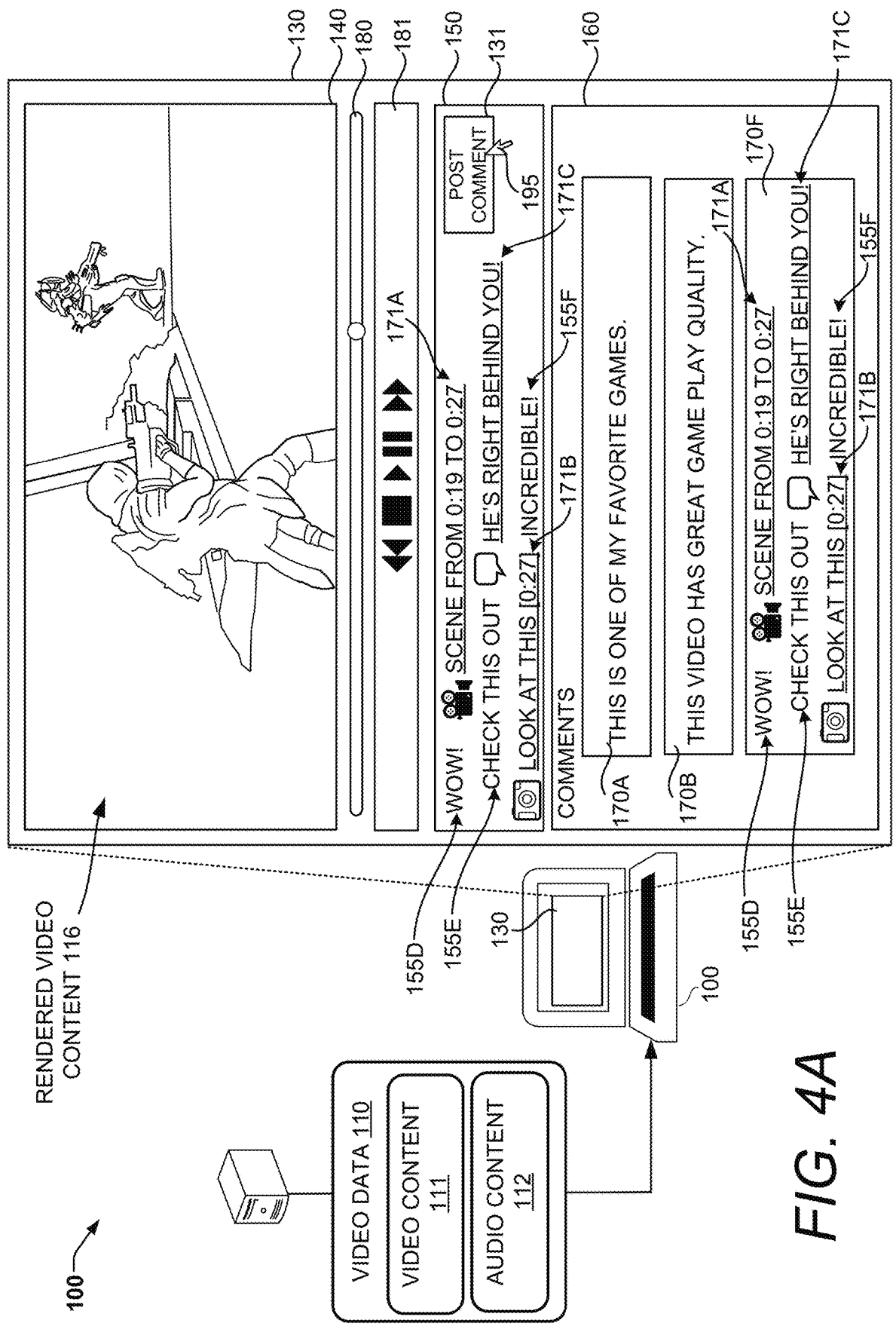
FIG. 4A is a combined system and UI diagram that shows additional aspects of the system illustrated in FIG. 1A, according to one embodiment disclosed herein.
Figure 4B:
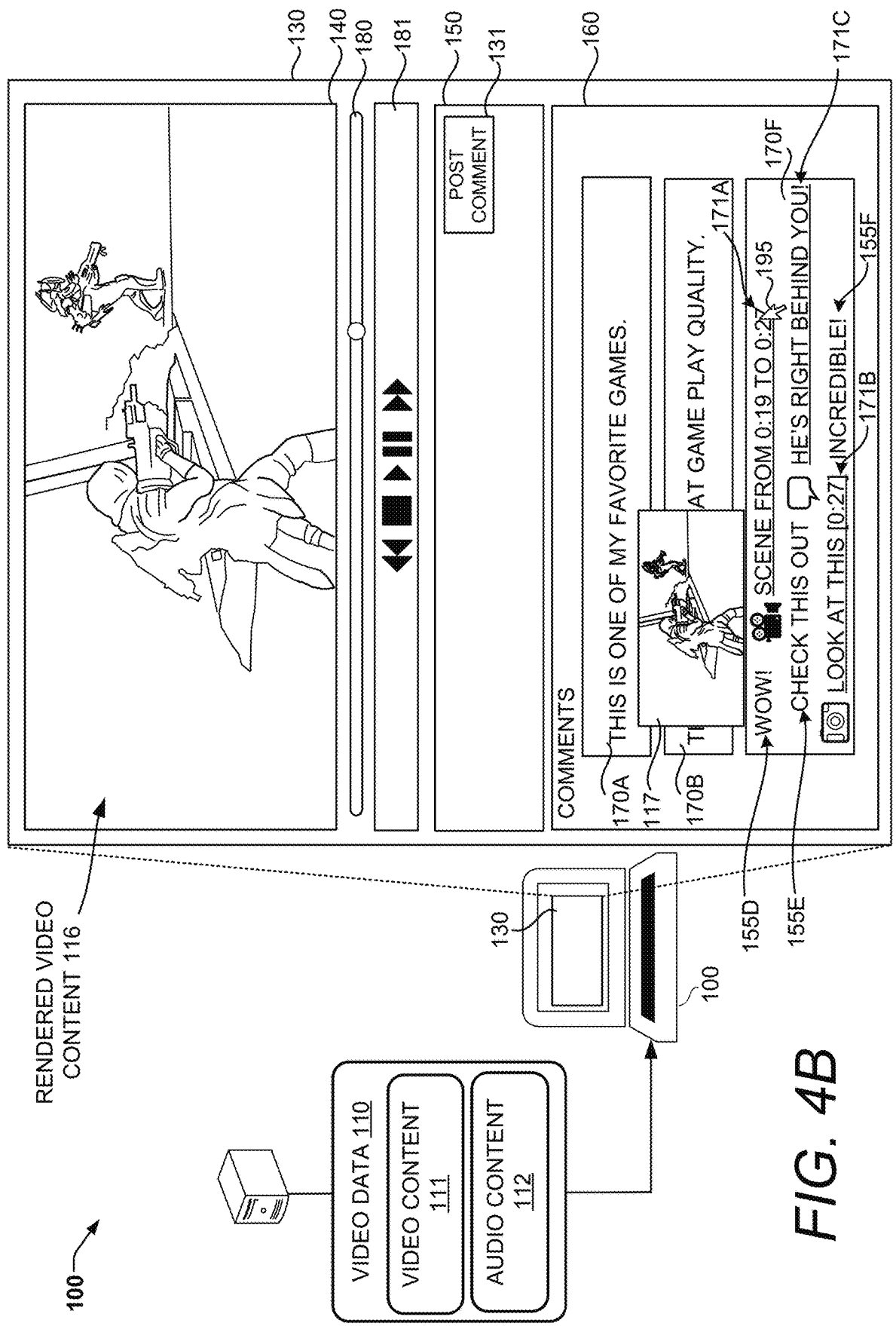
FIG. 4B is a combined system and UI diagram that shows additional aspects of the system illustrated in FIG. 1A, according to one embodiment disclosed herein.
Figure 4C:
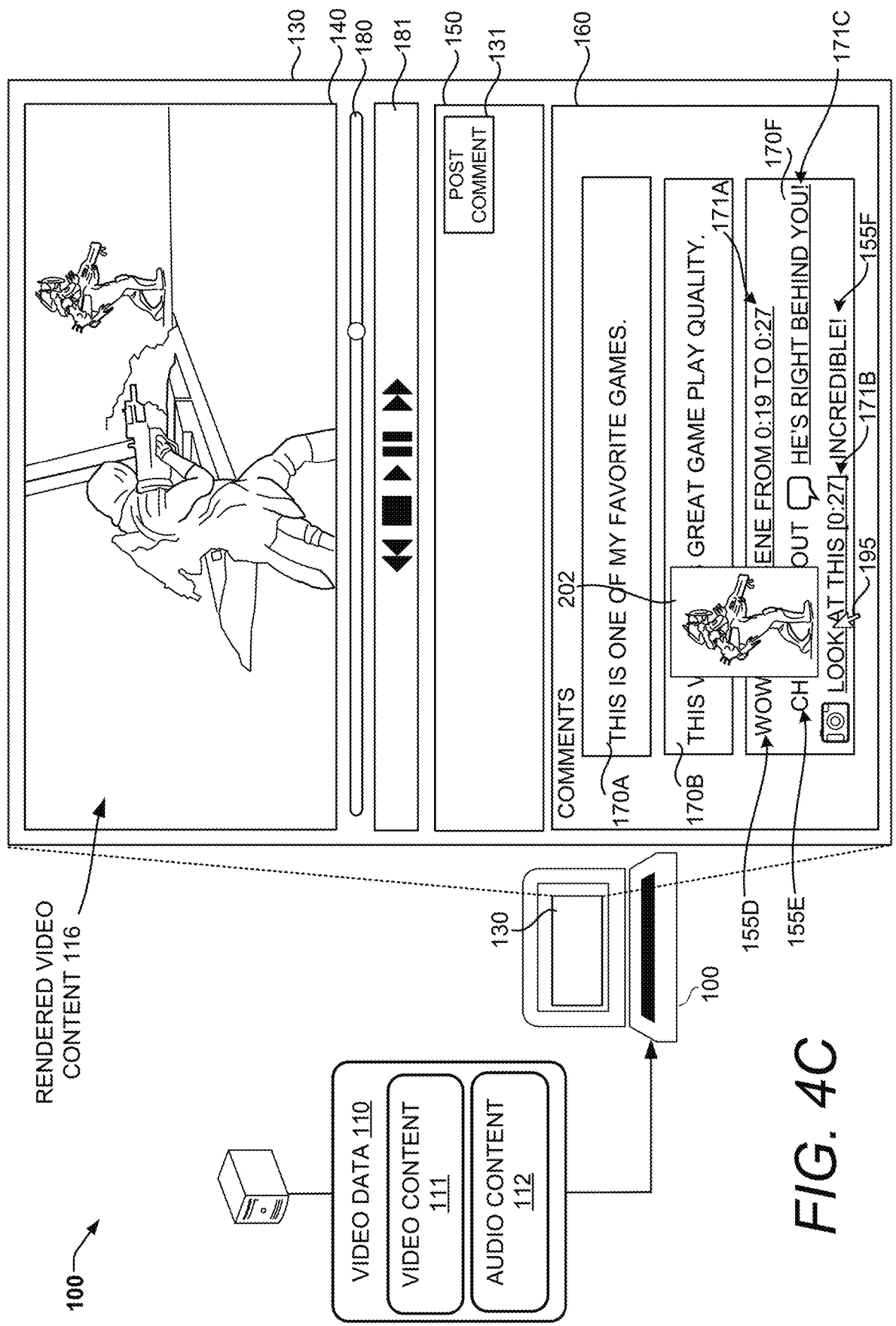
FIG. 4C is a combined system and UI diagram that shows additional aspects of the system illustrated in FIG. 1A, according to one embodiment disclosed herein.

In the example shown in FIG. 4C, a thumbnail preview 202 of the region 201 is presented adjacent to the typed hyperlink 171B in response to selection of the typed hyperlink 171B (e.g. by hovering the mouse cursor 195 over the typed hyperlink 171B). In the example shown in FIG. 4D, a preview of the portion 302 of the closed caption text 302 referenced by the typed hyperlink 171C is provided in response to the mouse cursor 195 being placed over the typed link 171C in the comment 170F. As discussed above, the preview in this example is generated by converting the closed caption text referenced by the typed link 171C to speech and playing the audio 304 of the speech.

Figure 5:
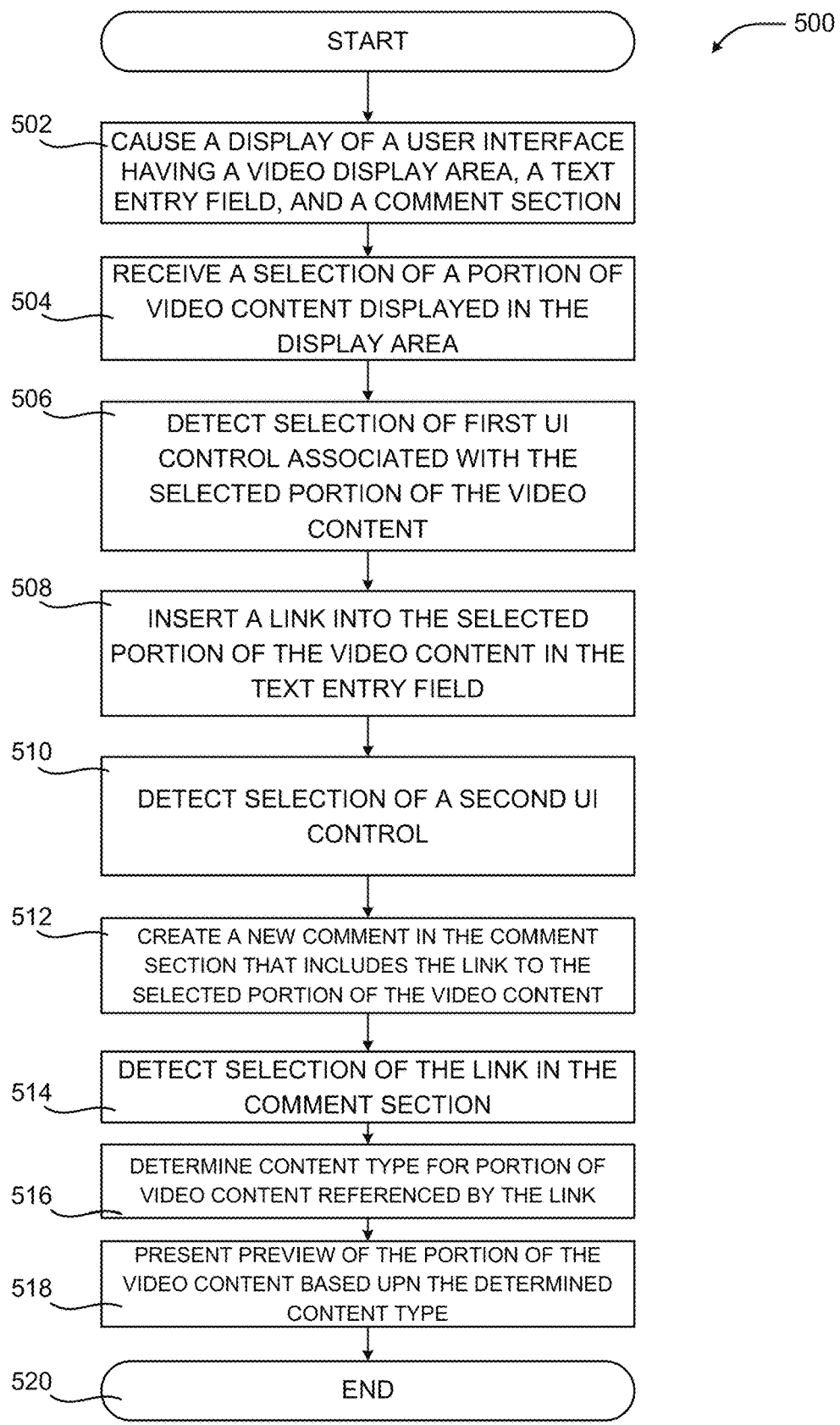
FIG. 5 is a flow diagram illustrating aspects of a routine for authoring comments that include typed hyperlinks referencing portions of video content and for previewing video content referenced by typed hyperlinks, according to one embodiment disclosed herein.

FIG. 5 is a flow diagram illustrating aspects of a routine 500 for authoring comments that include typed hyperlinks referencing portions of video content and for previewing video content referenced by typed hyperlinks, according to one embodiment disclosed herein. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 5 and the other FIGURES can be implemented in association with the example presentation UIs described above. For instance, the various device(s) and/or module(s) described herein can generate, transmit, receive, and/or display data associated with content of a video (e.g., live content, broadcasted event, recorded content, etc.) and/or a presentation UI that includes renderings of one or more participants of remote computing devices, avatars, channels, chat sessions, video streams, images, virtual objects, and/or applications associated with a video.

The routine 500 begins at operation 502, where the system 100 can cause a display of a UI 130 having a video display area 130, a text entry field 150, and a comment section 160. One example of such a UI 130 is shown in FIGS. 1A-4D and described above. The UI 130 can be displayed on a client device such as a tablet, mobile phone, desktop computer, etc.

Next, at operation 504, the system can the system 100 can receive a selection of a portion of video content 116 displayed in the display area 130. As discussed above, for example, UI controls can be provided to enable a user to select an interval of video content, a region in a frame of video content, or closed caption text associated with the video content.

From operation 504, the routine 500 proceeds to operation 506, where the system 100 detects the selection of a UI control associated with the selected portion of the video content. For instance, in some embodiments a UI control 190 for generating a typed hyperlink 171 that references the selected portion of the video content is presented. From operation 506, the routine 500 proceeds to operation 508, where the system 100 inserts a typed link 171 to the selected portion of the video content in the text entry field 150.

From operation 508, the routine 500 proceeds to operation 510, where the system 100 detects the selection of a UI control 131 for creating a new comment 170 that includes a typed hyperlink 171 in the comment section 160 of the UI 130. At operation 512, the system 100 creates a new comment 170 and displays the new comment 170 in the comment section 160 of the UI 130 in response to detecting the selection of the UI control 131. As discussed above, the new comment 170 includes the typed link 171 and, potentially, other content from the text entry field 160 such as user-provided text.

From operation 512, the routine 500 proceeds to operation 514, where the system 100 detects the selection of a typed link 171 such as, for example, by detecting a mouse cursor 195 hovering over the typed link 171. In response thereto, the routine 500 proceeds to operation 516, where the system 100 determines the content type for the referenced portion of the video content based on data in the selected link 171.

From operation 516, the routine 500 proceeds to operation 518, where the system 100 presents a preview of the video content based upon the determined content type for the referenced portion of the video content. For example, an interval of video might be played, a region within a frame of video content might be displayed, or audio of closed caption text might be played. The routine 500 then proceeds from operation 518 to operation 520, where it ends.

It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

Figure 6:
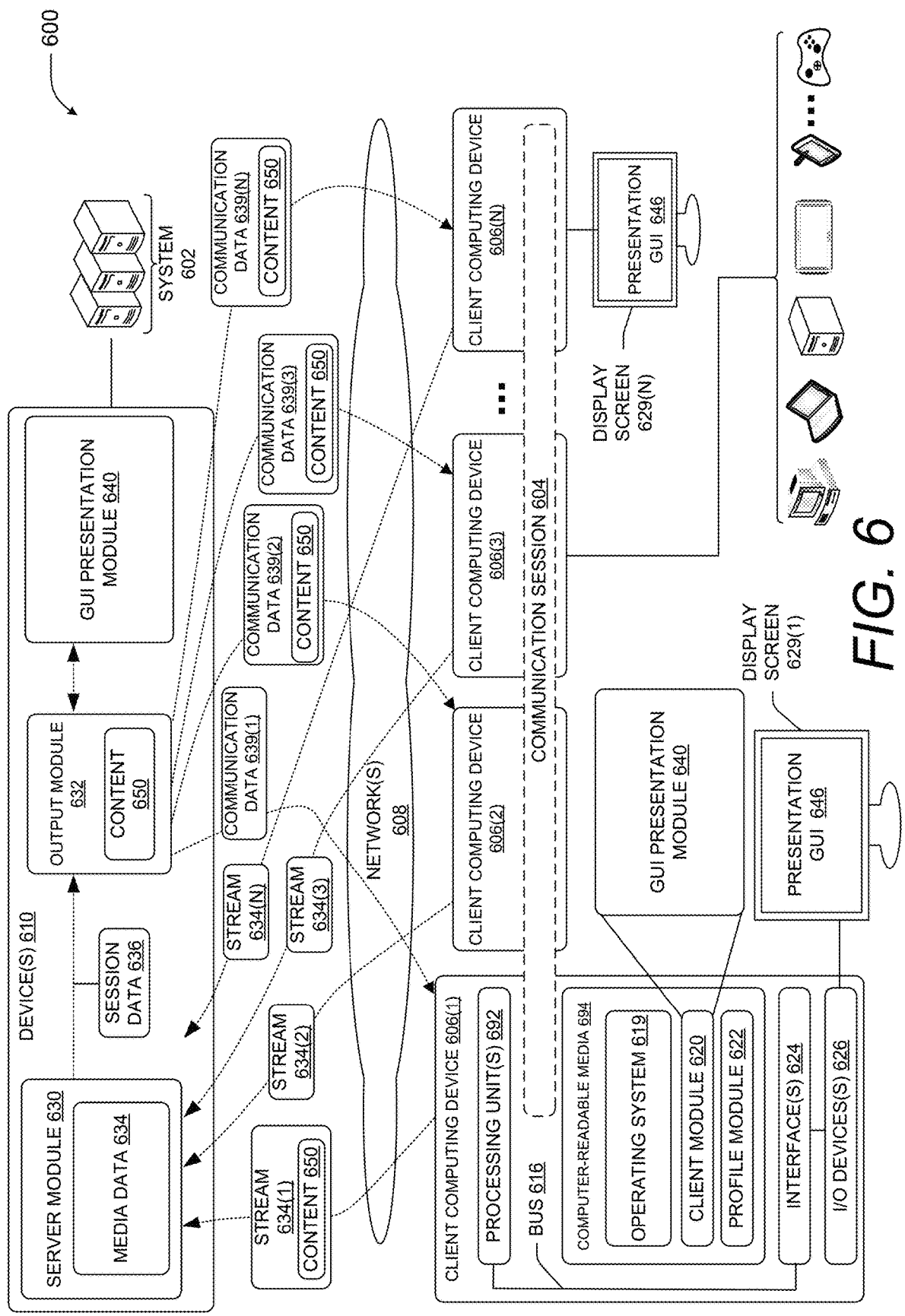
FIG. 6 is a computing system diagram showing aspects of an illustrative operating environment for the technologies disclosed herein.

FIG. 6 is a diagram illustrating an example environment 600 in which a system 602 can implement the technologies disclosed herein. In some implementations, a system 602 may function to collect, analyze, and share data defining one or more objects that are displayed to users of a communication session 1004.

As illustrated, the communication session 604 may be implemented between a number of client computing devices 606(1) through 606(N) (where N is a number having a value of two or greater) that are associated with the system 602 or are part of the system 602. The client computing devices 606(1) through 606(N) enable users, also referred to as individuals, to participate in the communication session 604. Although this embodiment illustrates a communication session 604, can be appreciated that a communication session 604 is not necessary for every embodiment disclosed herein. It can be appreciated that video streams can be uploaded by each client 606 and that comments can be provided by each client 606. It can be appreciated that any client 606 can also receive video data and audio data from the server module 630.

In this example, the communication session 604 is hosted, over one or more network(s) 608, by the system 602. That is, the system 602 can provide a service that enables users of the client computing devices 606(1) through 606(N) to participate in the communication session 604 (e.g., via a live viewing and/or a recorded viewing). Consequently, a "participant" to the communication session 604 can comprise a user and/or a client computing device (e.g., multiple users may be in a room participating in a communication session via the use of a single client computing device), each of which can communicate with other participants. As an alternative, the communication session 604 can be hosted by one of the client computing devices 606(1) through 606(N) utilizing peer-to-peer technologies. The system 602 can also host chat conversations and other team collaboration functionality (e.g., as part of an application suite).

In some implementations, such chat conversations and other team collaboration functionality are considered external communication sessions distinct from the communication session 604. A computerized agent to collect participant data in the communication session 604 may be able to link to such external communication sessions. Therefore, the computerized agent may receive information, such as date, time, session particulars, and the like, that enables connectivity to such external communication sessions. In one example, a chat conversation can be conducted in accordance with the communication session 604. Additionally, the system 602 may host the communication session 604, which includes at least a plurality of participants co-located at a meeting location, such as a meeting room or auditorium, or located in disparate locations.

In the examples described herein, client computing devices 606(1) through 606(N) participating in the communication session 604 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 604 live as activity occurs, or alternatively, via a recording at a later time after the activity occurs. In examples described herein, client computing devices 606(1) through 606(N) participating in the communication session 604 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations. Each stream can also include text, audio and video data, such as the data communicated within a Channel, chat board, or a private messaging service.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 602 includes device(s) 610. The device(s) 610 and/or other components of the system 602 can include distributed computing resources that communicate with one another and/or with the client computing devices 606(1) through 606(N) via the one or more network(s) 608. In some examples, the system 602 may be an independent system that is tasked with managing aspects of one or more communication sessions such as communication session 604. As an example, the system 602 may be managed by entities such as YOUTUBE, FACEBOOK, SLACK, WEBEX, GOTOMEETING, GOOGLE HANGOUTS, etc.

Network(s) 608 may include, for example, public networks such as the Internet, private networks such as an institutional and/or personal intranet, or some combination of private and public networks. Network(s) 608 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 608 may utilize communications protocols, including packet-based and/or datagram-based protocols such as Internet protocol ("IP"), transmission control protocol ("TCP"), user datagram protocol ("UDP"), or other types of protocols. Moreover, network(s) 608 may also include a number of devices that facilitate network communications and/or form a hardware basis for the networks, such as switches, routers, gateways, access points, firewalls, base stations, repeaters, backbone devices, and the like.

In some examples, network(s) 608 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 610 may include one or more computing devices that operate in a cluster or other grouped configuration to share resources, balance load, increase performance, provide fail-over support or redundancy, or for other purposes. For instance, device(s) 610 may belong to a variety of classes of devices such as traditional server-type devices, desktop computer-type devices, and/or mobile-type devices. Thus, although illustrated as a single type of device or a server-type device, device(s) 610 may include a diverse variety of device types and are not limited to a particular type of device. Device(s) 610 may represent, but are not limited to, server computers, desktop computers, web-server computers, personal computers, mobile computers, laptop computers, tablet computers, or any other sort of computing device.

A client computing device (e.g., one of client computing device(s) 606(1) through 606(N)) may belong to a variety of classes of devices, which may be the same as, or different from, device(s) 610, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 606(1) through 606(N) of the various classes and device types can represent any type of computing device having one or more data processing unit(s) 692 operably connected to computer-readable media 694 such as via a bus 616, which in some instances can include one or more of a system bus, a data bus, an address bus, a PCI bus, a Mini-PCI bus, and any variety of local, peripheral, and/or independent buses.

Executable instructions stored on computer-readable media 694 may include, for example, an operating system 619, a client module 620, a profile module 622, and other modules, programs, or applications that are loadable and executable by data processing units(s) 692.

Client computing device(s) 606(1) through 606(N) may also include one or more interface(s) 624 to enable communications between client computing device(s) 606(1) through 606(N) and other networked devices, such as device(s) 610, over network(s) 608. Such network interface(s) 624 may include one or more network interface controllers (NICs) or other types of transceiver devices to send and receive communications and/or data over a network. Moreover, client computing device(s) 606(1) through 606(N) can include input/output ("I/O") interfaces (devices) 626 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 6 illustrates that client computing device 606(1) is in some way connected to a display device (e.g., a display screen 629(1)), which can display a UI according to the technologies described herein.

In the example environment 600 of FIG. 6, client computing devices 606(1) through 606(N) may use their respective client modules 620 to connect with one another and/or other external device(s) in order to participate in the communication session 604, or in order to contribute activity to a collaboration environment. For instance, a first user may utilize a client computing device 606(1) to communicate with a second user of another client computing device 606(2). When executing client modules 620, the users may share data, which may cause the client computing device 606(1) to connect to the system 602 and/or the other client computing devices 606(2) through 606(N) over the network(s) 608.

The client computing device(s) 606(1) through 606(N) (each of which are also referred to herein as a "data processing system") may use their respective profile modules 622 to generate participant profiles (not shown in FIG. 6) and provide the participant profiles to other client computing devices and/or to the device(s) 610 of the system 602. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 6, the device(s) 610 of the system 602 include a server module 630 and an output module 632. In this example, the server module 630 is configured to receive, from individual client computing devices such as client computing devices 606(1) through 606(N), media streams 634(1) through 634(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 630 is configured to receive a collection of various media streams 634(1) through 634(N) during a live viewing of the communication session 604 (the collection being referred to herein as "media data 634"). In some scenarios, not all of the client computing devices that participate in the communication session 604 provide a media stream. For example, a client computing device may only be a consuming, or a "listening", device such that it only receives content associated with the communication session 604 but does not provide any content to the communication session 604.

In various examples, the server module 630 can select aspects of the media streams 634 that are to be shared with individual ones of the participating client computing devices 606(1) through 606(N). Consequently, the server module 630 may be configured to generate session data 636 based on the streams 634 and/or pass the session data 636 to the output module 632. Then, the output module 632 may communicate communication data 639 to the client computing devices (e.g., client computing devices 606(1) through 606(3) participating in a live viewing of the communication session). The communication data 639 may include video, audio, and/or other content data, provided by the output module 632 based on content 650 associated with the output module 632 and based on received session data 636.

As shown, the output module 632 transmits communication data 639(1) to client computing device 606(1), and transmits communication data 639(2) to client computing device 606(2), and transmits communication data 639(3) to client computing device 606(3), etc. The communication data 639 transmitted to the client computing devices can be the same or can be different (e.g., positioning of streams of content within a user interface may vary from one device to the next).

In various implementations, the device(s) 610 and/or the client module 620 can include GUI presentation module 640. The GUI presentation module 640 may be configured to analyze communication data 639 that is for delivery to one or more of the client computing devices 606. Specifically, the GUI presentation module 640, at the device(s) 610 and/or the client computing device 606, may analyze communication data 639 to determine an appropriate manner for displaying video, image, and/or content on the display screen 629 of an associated client computing device 606. In some implementations, the GUI presentation module 640 may provide video, image, and/or content to a presentation GUI 646 rendered on the display screen 629 of the associated client computing device 606. The presentation GUI 646 may be caused to be rendered on the display screen 629 by the GUI presentation module 640. The presentation GUI 646 may include the video, image, and/or content analyzed by the GUI presentation module 640.

In some implementations, the presentation GUI 646 may include a plurality of sections or grids that may render or comprise video, image, and/or content for display on the display screen 629. For example, a first section of the presentation GUI 646 may include a video feed of a presenter or individual, a second section of the presentation GUI 646 may include a video feed of an individual consuming meeting information provided by the presenter or individual. The GUI presentation module 640 may populate the first and second sections of the presentation GUI 646 in a manner that properly imitates an environment experience that the presenter and the individual may be sharing.

In some implementations, the GUI presentation module 640 may enlarge or provide a zoomed view of the individual represented by the video feed in order to highlight a reaction, such as a facial feature, the individual had to the presenter. In some implementations, the presentation GUI 646 may include a video feed of a plurality of participants associated with a meeting, such as a general communication session. In other implementations, the presentation GUI 646 may be associated with a channel, such as a chat channel, enterprise teams channel, or the like. Therefore, the presentation GUI 646 may be associated with an external communication session that is different than the general communication session.

Figure 7:
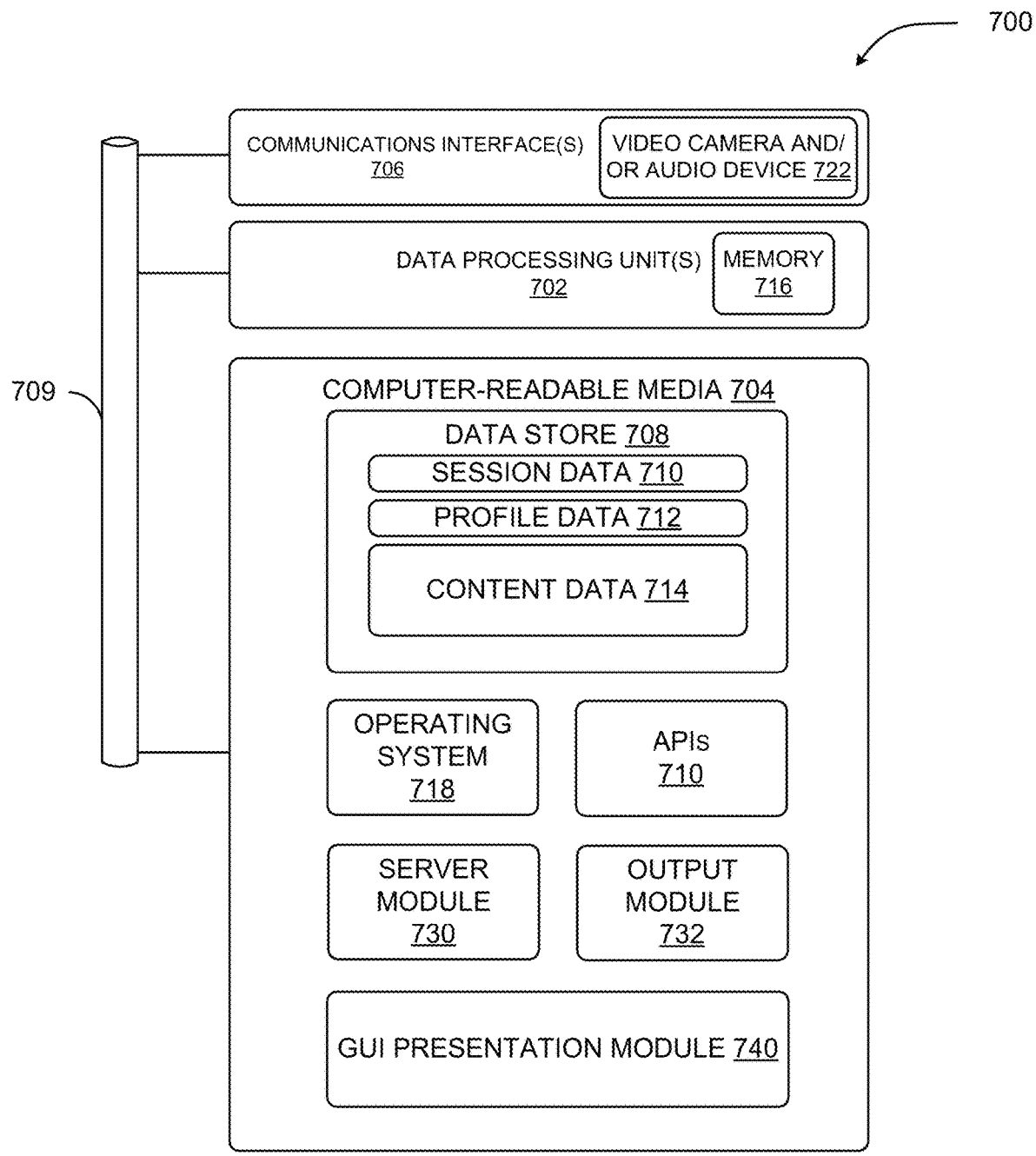
FIG. 7 is a computing architecture diagram showing aspects of the configuration and operation of a computing device that can implement aspects of the technologies disclosed herein.

FIG. 7 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen 629. The device 700 may represent one of the device(s) described herein.

Additionally, or alternatively, the device 700 may represent one of the client computing devices 606.

As illustrated, the device 700 includes one or more data processing unit(s) 702, computer-readable media 704, and communication interface(s) 706. The components of the device 700 are operatively connected, for example, via a bus 709, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 692, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 704 and computer-readable media 694, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 706 may represent, for example, network interface controllers ("NICs") or other types of transceiver devices to send and receive communications over a network. Furthermore, the communication interface(s) 706 may include one or more video cameras and/or audio devices 722 to enable generation of video feeds and/or still images, and so forth.

In the illustrated example, computer-readable media 704 includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 708 may store data for the operations of processes, applications, components, and/or modules stored in computer-readable media 704 and/or executed by data processing unit(s) 702 and/or accelerator(s). For instance, in some examples, the data store 708 may store session data 710 (e.g., session data 636), profile data 712 (e.g., associated with a participant profile), and/or other data. The session data 710 can include a total number of participants (e.g., users and/or client computing devices) in a communication session, activity that occurs in the communication session, a list of invitees to the communication session, and/or other data related to when and how the communication session is conducted or hosted. The data store 708 may also include content data 714, such as the content that includes video, audio, or other content for rendering and display on one or more of the display screens 629.

Alternately, some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) 710 (APIs) configured to expose the functionality and the data of the device 700 to other devices. Additionally, the computer-readable media 704 includes one or more modules such as the server module 730, the output module 732, and the GUI presentation module 740, although the number of illustrated modules is just an example, and the number may vary higher or lower. That is, functionality described herein in association with the illustrated modules may be performed by a fewer number of modules or a larger number of modules on one device or spread across multiple devices.

It is to be appreciated that conditional language used herein such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Other variations applied to the techniques disclosed herein can also be within the scope of the present disclosure. For instance, although the examples disclosed herein refer to a selection of a link, the techniques disclosed herein include any user selection of a character, word, and image or any other graphical element associated with a comment or text. Thus, if a user selects a particular word or a particular image within a comment, the system can respond by displaying a preview of the content referenced by a link within the comment.

The disclosure presented herein also encompasses the subject matter set forth in the following clauses:

Clause 1. A method for execution to be performed by a data processing system, the method comprising: causing a user interface (UI) to be displayed, the UI comprising a video display area, a text entry field, and a comment section; receiving a selection of a portion of video content displayed in the video display area; detecting selection of a first UI control associated with the selected portion of the video content; responsive to the selection of the first UI control, inserting a link to the selected portion of the video content in the text entry field, the link having an associated type identifying a type of the selected portion of the video content; detecting selection of a second UI control; and responsive to the selection of the second UI control, creating a new comment in the comment section of the UI, the new comment comprising the link to the selected portion of the video content.

Clause 2. The method of clause 1, wherein the portion of the video content comprises an interval of the video content.

Clause 3. The method of any of clauses 1 or 2, wherein link further comprises link text identifying a time period of the interval of the video content Clause 4. The method of any of clauses 1-3, wherein the portion of the video content comprises a region in a frame of the video content.

Clause 5. The method of any of clauses 1-4, wherein the link further comprises link text identifying a time associated with the frame of the video content.

Clause 6. The method of any of clauses 1-5, wherein the region encompasses an object in the frame of the video content.

Clause 7. The method of any of clauses 1-6, wherein the portion of the video content comprises closed caption text associated with the video content.

Clause 8. The method of any of clauses 1-7, further comprising presenting a preview of the selected portion of the video content adjacent to the link prior to detecting selection of the second UI control.

Clause 9. The method of any of clauses 1-8, wherein the link further comprises default link text and wherein the default link text is user-editable.

Clause 10. The method of any of clauses 1-9, further comprising receiving text in the text entry field and wherein the new comment further comprises the received text.

Clause 11. A computer-readable storage medium having computer-executable instructions encoded thereupon which, when executed by a processor, cause the processor to: cause a user interface (UI) to be displayed, the UI comprising a video display area displaying video content, a text entry field, and a comment section; receive input defining a selection of a portion of the video content displayed in the video display area; detecting selection of a first UI control; responsive to detecting the selection of the first UI control, insert a link to the selected portion of the video content in the text entry field, the link having an associated type identifying a type of the selected portion of the video content; detecting selection of a second UI control; and responsive to detecting the selection of the second UI control, creating a new comment in the comment section of the UI, the new comment comprising the link to the selected portion of the video content.

Clause 12. The computer-readable storage medium of clause 11, wherein the portion of the video content comprises an interval of the video content, a region in a frame of the video content, or closed caption text associated with the video content.

Clause 13. The computer-readable storage medium of any of clauses 11 or 12, having further computer-executable instructions encoded thereupon to cause a preview of the selected portion of the video content to be presented adjacent to the link prior to detecting selection of the second UI control.

Clause 14. The computer-readable storage medium of any of clauses 11-13, wherein the first user interface control is displayed adjacent to a UI control for defining the selection of the portion of the video, and wherein the second user interface control is displayed adjacent to the text entry field.

Clause 15. The computer-readable storage medium of any of clauses 11-14, wherein the link further comprises a visual indicator identifying the type of the selected portion of the video content.

Clause 16. A system, comprising: means for causing a user interface (UI) to be displayed, the UI comprising a video display area displaying video content, a text entry field, and a comment section; means for receiving input defining a selection of a portion of the video content displayed in the video display area; means for detecting selection of a first UI control; means for inserting a link to the selected portion of the video content in the text entry field responsive to detecting the selection of the first UI control, the link having an associated type identifying a type of the selected portion of the video content; means for detecting selection of a second UI control; and means for creating a new comment in the comment section of the UI responsive to detecting the selection of the second UI control, the new comment comprising the link to the selected portion of the video content.

Clause 17. The system of clause 16, wherein the portion of the video content comprises an interval of the video content, a region in a frame of the video content, or closed caption text associated with the video content.

Clause 18. The system of any of clauses 16 or 17, wherein the region encompasses an object in the frame of the video content.

Clause 19. The system of any of clauses 16-18, further comprising means for causing a preview of the selected portion of the video content to be presented adjacent to the link prior to detecting selection of the second UI control.

Clause 20. The system of any of clauses 16-19, further comprising means for further receiving text in the text entry field, wherein the new comment further comprises the received text.

It should also be appreciated that many variations and modifications may be made to the above-described examples, the elements of which are to be understood as being among other acceptable examples. All such modifications and variations are intended to be included herein within the scope of this disclosure and protected by the following claims.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method for execution to be performed by a data processing system, the method comprising:
   causing a user interface (UI) to be displayed, the UI comprising a video display area, a text entry field, and a comment section, wherein the video display area is configured to display a first rendering of video content;
   receiving a selection of a portion of video content displayed in the video display area;
   detecting selection of a first UI control associated with the selected portion of the video content;
   responsive to the selection of the first UI control, inserting a link to the selected portion of the video content in the text entry field, the link having an associated type identifying a type of the selected portion of the video content, wherein the link is configured to cause a second rendering showing the selected portion of the video content;
   detecting selection of the link within the text entry field;
   responsive to selection of the link, causing a playback of the second rendering of the selected portion of the video content starting from a time that is associated with the selected portion of the video content, wherein the playback of the second rendering is positioned at least partially within the text entry field of the UI, wherein the second rendering of the selected portion that is positioned at least partially within the text entry field is displayed prior to a creation of a new comment positioned within the comment section comprising the link to the selected portion of the video content from text in the text entry field;
   detecting selection of a second UI control; and
   responsive to the selection of the second UI control, creating the new comment positioned within the comment section of the UI, the new comment comprising the link to the selected portion of the video content.

2. The method of claim 1, wherein the portion of the video content comprises a region in a frame of the video content.

3. The method of claim 1, wherein the link further comprises link text identifying a time associated with the frame of the video content.

4. The method of claim 3, wherein the region encompasses an object in the frame of the video content.

5. The method of claim 1, wherein the portion of the video content comprises closed caption text associated with the video content, wherein the closed caption text is associated with the time for indicating the start of the playback.

6. The method of claim 1, further comprising presenting a preview of the selected portion of the video content adjacent to the link prior to detecting selection of the second UI control.

7. The method of claim 1, wherein a preview of the selected portion of the video content is positioned to display a rendering of the selected portion of the video content within the comment section of the user interface.

8. The method of claim 1, wherein a preview of the selected portion of the video content is positioned to display a rendering of the selected portion of the video content concurrently with the new comment within the comment section of the user interface.

9. The method of claim 1, wherein the playback of the selected portion of the video content is positioned within the comment section of the user interface, and wherein the playback of the selected portion of the video content is from the video content rendered in the video display area.

10. The method of claim 1, wherein the playback of the second rendering of the video content is concurrently played with the first rendering of the video content.

11. The method of claim 1, wherein the user interface is configured to cause a playback of the second rendering of the video content simultaneously with the first rendering of the video content.

12. The method of claim 1, wherein the user interface is configured to cause a playback of the second rendering of the video content concurrently with the first rendering of the video content, wherein the playback of the second rendering that is positioned at least partially within the text entry field is displayed prior to the creation of the new comment comprising a link to generate a third rendering of the selected portion of the video content starting from a time that is associated with the selected portion of the video content.

13. The method of claim 1, further comprising causing a playback of a third rendering of the selected portion of the video content starting from a time that is associated with the selected portion of the video content, wherein the playback of the third rendering is positioned within the comment section of the UI comprising a plurality of comments, wherein the playback of the third rendering is in response to a user selection of the link in the new comment.

14. The method of claim 13, wherein the playback of the third rendering is positioned at least partially over the new comment.

15. The method of claim 1, wherein the second rendering of the selected portion that is positioned at least partially within the text entry field is displayed prior to a playback of a third rendering of the selected portion of the video content starting from a time that is associated with the selected portion of the video content, wherein the playback of the third rendering is positioned within the comment section.

16. One or more computer storage media having computer-executable instructions encoded thereupon which, when executed by a processor, cause the processor to:
   cause a user interface (UI) to be displayed, the UI comprising a video display area displaying video content, a text entry field, and a comment section, wherein the video display area is configured to display a first rendering of video content;
   receive input defining a selection of a portion of the video content displayed in the video display area;
   detect selection of a first UI control;
   responsive to detecting the selection of the first UI control, insert a link to the selected portion of the video content in the text entry field, the link having an associated type identifying a type of the selected portion of the video content, wherein the link is configured to cause a second rendering showing the selected portion of the video content;
   detect selection of the link within the text entry field;
   responsive to detecting selection of the link, cause a playback of the second rendering of the selected portion of the video content starting from a time that is associated with the selected portion of the video content, wherein the playback of the second rendering is positioned at least partially within the text entry field of the UI, wherein the second rendering of the selected portion that is positioned at least partially within the text entry field is displayed prior to a creation of a new comment positioned within the comment section comprising the link to the selected portion of the video content from text in the text entry field;

detect selection of a second UI control; and responsive to detecting the selection of the second UI control, creating the new comment having a least a portion of the comment positioned within the comment section of the UI, the new comment comprising the link to the selected portion of the video content.

17. The one or more computer storage media of claim 16, wherein the portion of the video content comprises an interval of the video content, a region in a frame of the video content, or closed caption text associated with the video content.

18. The one or more computer storage media of claim 16, wherein the first user interface control is displayed adjacent to a UI control for defining the selection of the portion of the video, and wherein the second user interface control is displayed adjacent to the text entry field.

19. A system, comprising:
   means for causing a user interface (UI) to be displayed, the UI comprising a video display area displaying video content, a text entry field, and a comment section, wherein the video display area is configured to display a first rendering of video content;
   means for receiving input defining a selection of a portion of the video content displayed in the video display area;
   means for detecting selection of a first UI control;
   means for inserting a link to the selected portion of the video content in the text entry field responsive to detecting the selection of the first UI control, the link having an associated type identifying a type of the selected portion of the video content;
   means for detecting selection of the link within the text entry field;
   means for causing a playback of the second rendering of the selected portion of the video content starting from a time that is associated with the selected portion of the video content responsive to detecting the selection of the link, wherein the playback of the second rendering is positioned at least partially within the text entry field of the UI, wherein the second rendering of the selected portion that is positioned at least partially within the text entry field is displayed prior to a creation of a new comment positioned within the comment section comprising the link to the selected portion of the video content from text in the text entry field;
   means for detecting selection of a second UI control; and
   means for creating the new comment having at least a portion of the new comment positioned within the comment section of the UI responsive to detecting the selection of the second UI control, the new comment comprising the link to the selected portion of the video content, wherein the link is configured to cause a second rendering showing the selected portion of the video content.

20. The system of claim 19, wherein the portion of the video content comprises an interval of the video content, a region in a frame of the video content, or closed caption text associated with the video content.

* * * * *